US008718340B2

(12) United States Patent
Madabhushi et al.

(10) Patent No.: US 8,718,340 B2
(45) Date of Patent: May 6, 2014

(54) SYSTEM AND METHOD FOR ACCURATE AND RAPID IDENTIFICATION OF DISEASED REGIONS ON BIOLOGICAL IMAGES WITH APPLICATIONS TO DISEASE DIAGNOSIS AND PROGNOSIS

(75) Inventors: Anant Madabhushi, South Plainfield, NJ (US); James Monaco, Piscataway, NJ (US); John Tomaszewski, Abington, PA (US); Michael Feldman, Gernet Valley, PA (US); Ajay Basavanhally, Skillman, NJ (US)

(73) Assignees: Trustees of the University of Pennsylvania, Philadelphia, PA (US); Rutgers, The State University of New Jersey, New Brunswick, NJ (US)

( * ) Notice: Subject to any disclaimer, the term of this patent is extended or adjusted under 35 U.S.C. 154(b) by 123 days.

(21) Appl. No.: 13/061,843

(22) PCT Filed: Sep. 3, 2009

(86) PCT No.: PCT/US2009/004979
§ 371 (c)(1),
(2), (4) Date: Jun. 20, 2011

(87) PCT Pub. No.: WO2010/027476
PCT Pub. Date: Mar. 11, 2010

(65) Prior Publication Data
US 2011/0243417 A1    Oct. 6, 2011

Related U.S. Application Data

(60) Provisional application No. 61/093,884, filed on Sep. 3, 2008.

(51) Int. Cl.
*G06K 9/00* (2006.01)
*A61B 5/00* (2006.01)

(52) U.S. Cl.
USPC .......................................... 382/128; 600/300

(58) Field of Classification Search
USPC .......... 382/128–134; 600/407, 410, 411, 425, 600/427; 435/29, 40.5, 320.1, 325, 70.5, 435/6.14, 7.23, 330; 436/64, 811, 813; 378/4, 7–21, 101
See application file for complete search history.

(56) References Cited

U.S. PATENT DOCUMENTS

| | | | |
|---|---|---|---|
| 6,677,152 B2 * | 1/2004 | Fisher ........................ | 435/320.1 |
| 7,092,748 B2 * | 8/2006 | Valdes Sosa et al. ......... | 600/407 |
| 7,209,581 B2 * | 4/2007 | Zhang et al. .................. | 382/131 |
| 7,613,505 B2 * | 11/2009 | Mazuir et al. ................. | 600/476 |
| 7,901,887 B2 * | 3/2011 | Tafas et al. .................... | 435/6.12 |
| 7,995,810 B2 * | 8/2011 | Li et al. ......................... | 382/128 |
| 2005/0265588 A1 * | 12/2005 | Gholap et al. ................ | 382/128 |
| 2010/0092064 A1 * | 4/2010 | Li ................................. | 382/133 |

* cited by examiner

*Primary Examiner* — Abolfazl Tabatabai
(74) *Attorney, Agent, or Firm* — Davidson, Davidson & Kappel, LLC

(57) ABSTRACT

The present invention relates to a method and system for detecting biologically relevant structures in a hierarchical fashion, beginning at a low-resolution and proceeding to higher levels of resolution. The present invention also provides probabilistic pairwise Markov models (PPMMs) to classify these relevant structures. The invention is directed to a novel classification approach which weighs the importance of these structures. The present invention also provides a fast, efficient computer-aided detection/diagnosis (CAD) system capable of rapidly processing medical images (i.e. high throughput). The computer-aided detection/diagnosis (CAD) system of the present invention allows for rapid analysis of medical images the improving the ability to effectively detect, diagnose, and treat certain diseases.

35 Claims, 14 Drawing Sheets

Overview of classification algorithm for detecting CaP glands from digitized WMHSs.

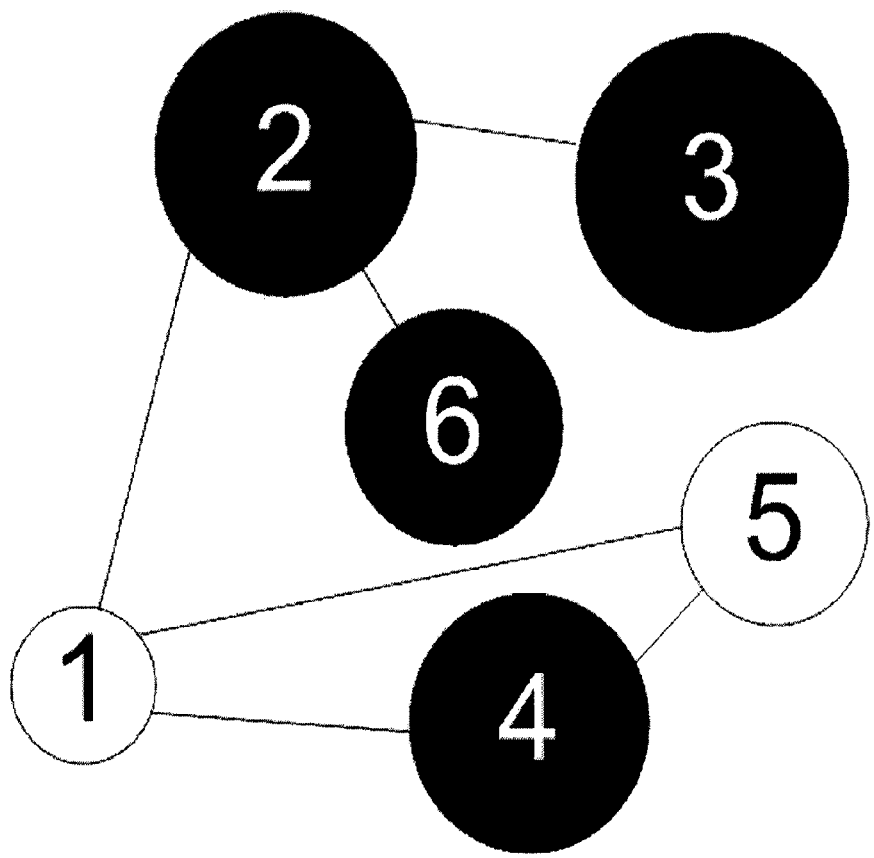
FIGURE 1. Graph with six sites and binary states. Each site has an associated feature $Y_s \in \mathbb{R}$. This is illustrated graphically by varying the diameter of each circle in accordance with the magnitude of its associated feature.

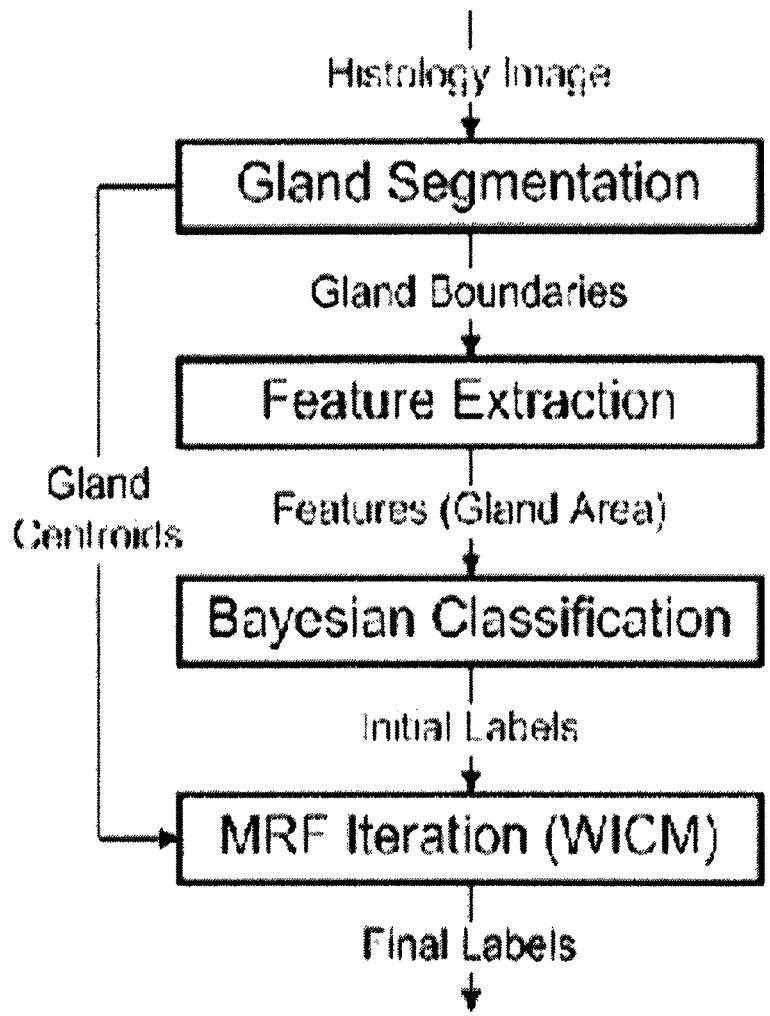
FIGURE 2. Overview of classification algorithm for detecting CaP glands from digitized WMHSs.

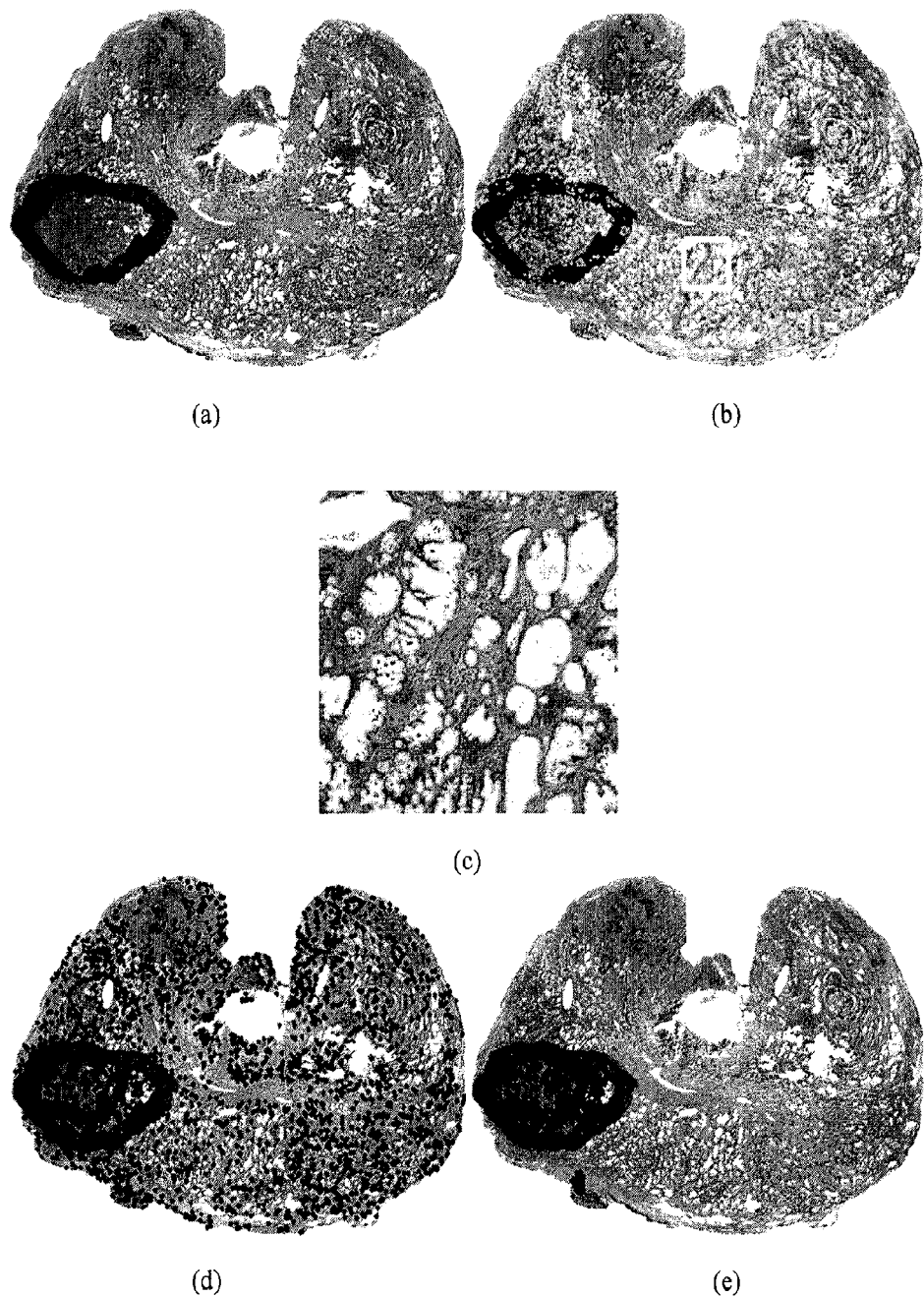
FIGURE 3. (a) H&E stained prostate histology section; black ink mark provided by pathologist indicates CaP extent. (b) Gland segmentation boundaries. (c) Magnified view of white box in (b). Centroids of cancerous glands before (d) and after (e) MRF iteration. The MRF was modeled using our PPMM.

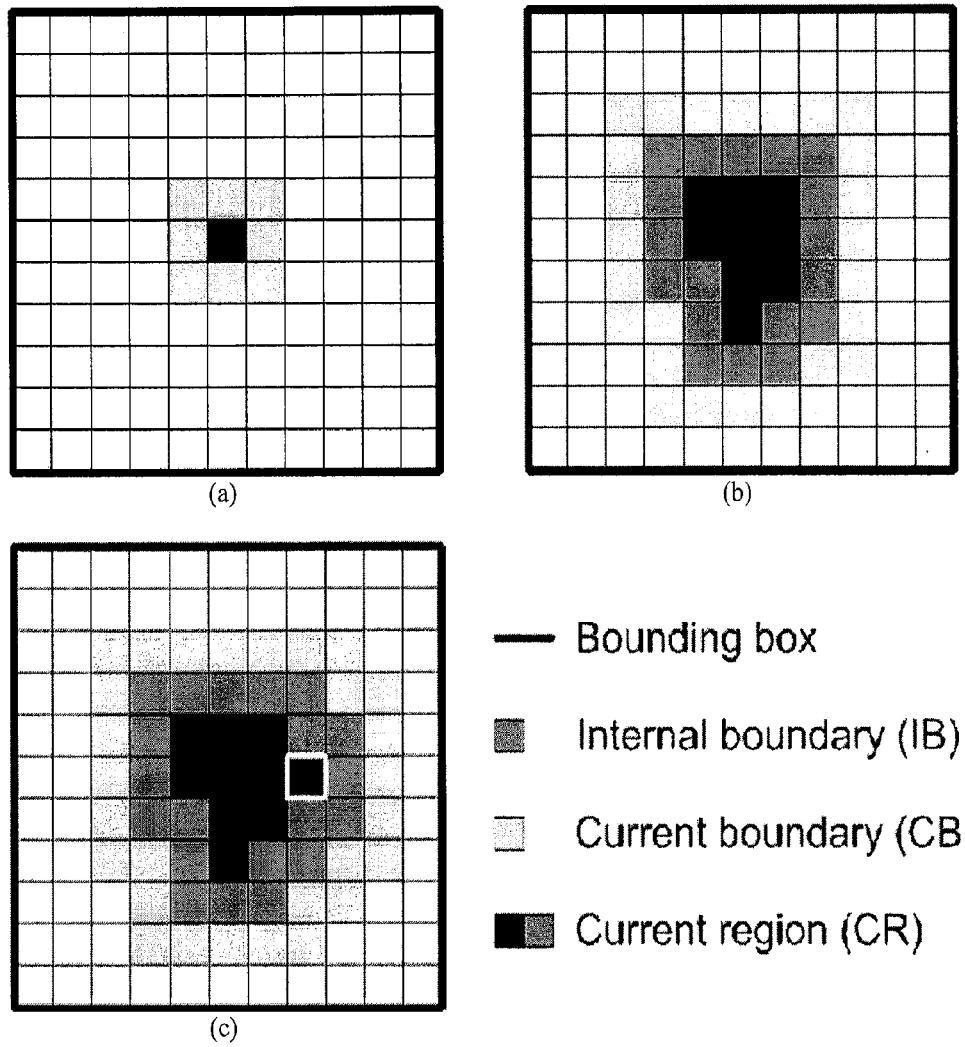
FIGURE 4. Region growing examples. (a) Seed pixel with CB. (b) IB, CB, and CR at step j in the growing procedure. (c) IB, CB, and CR at step j+1. The white box indicates the aggregated pixel.

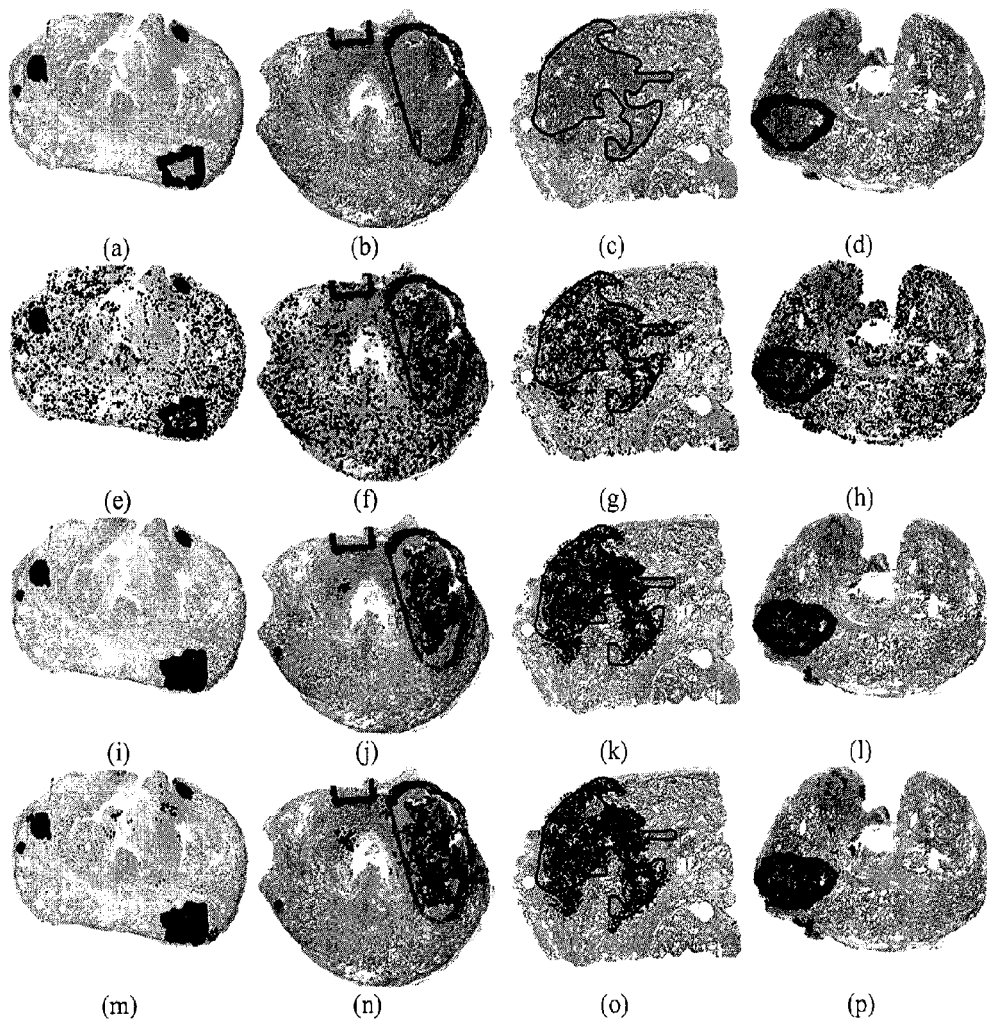
FIGURE 5. Results from gland detection algorithm. (a)-(d) H&E stained WMHSs. Black lines delineate CaP extent. (e)-(h) Initial labels for _area = 0.25. Blue dots indicate the centroids of the glands labeled as malignant. (i)-(l) PPMM GDS results with sensitivity adjusted to 72%. (m)-(p) Potts GDS results with sensitivity adjusted to 72%.

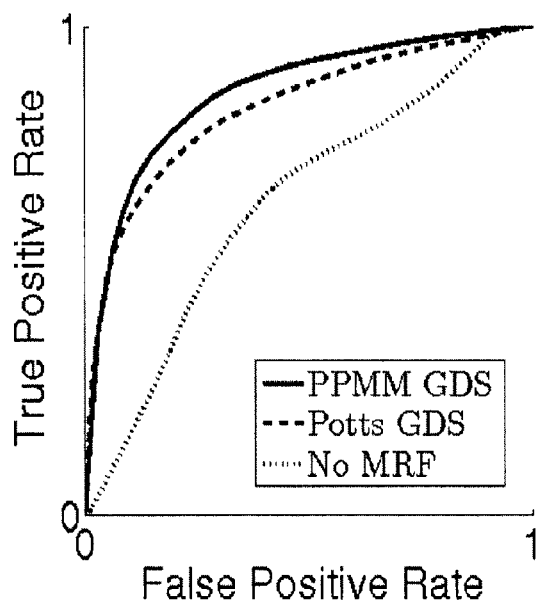

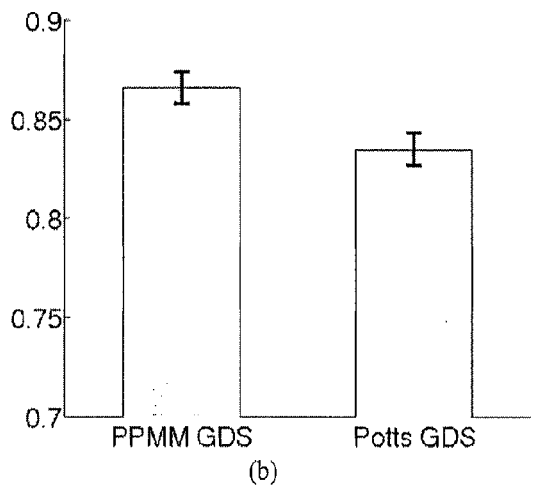

FIGURE 6. (a) Receiver operator characteristic (ROC) curves for PPMM GDS (solid) and Potts GDS (dashed) algorithms averaged over 20 trials using randomized 3-fold cross-validation. Dotted ROC curve indicates performance of initial classification based only on gland area. (b) Area under corresponding ROC curves in (a) for PPMM GDS and Potts GDS. Errors bars indicate standard error over the 20 trials.

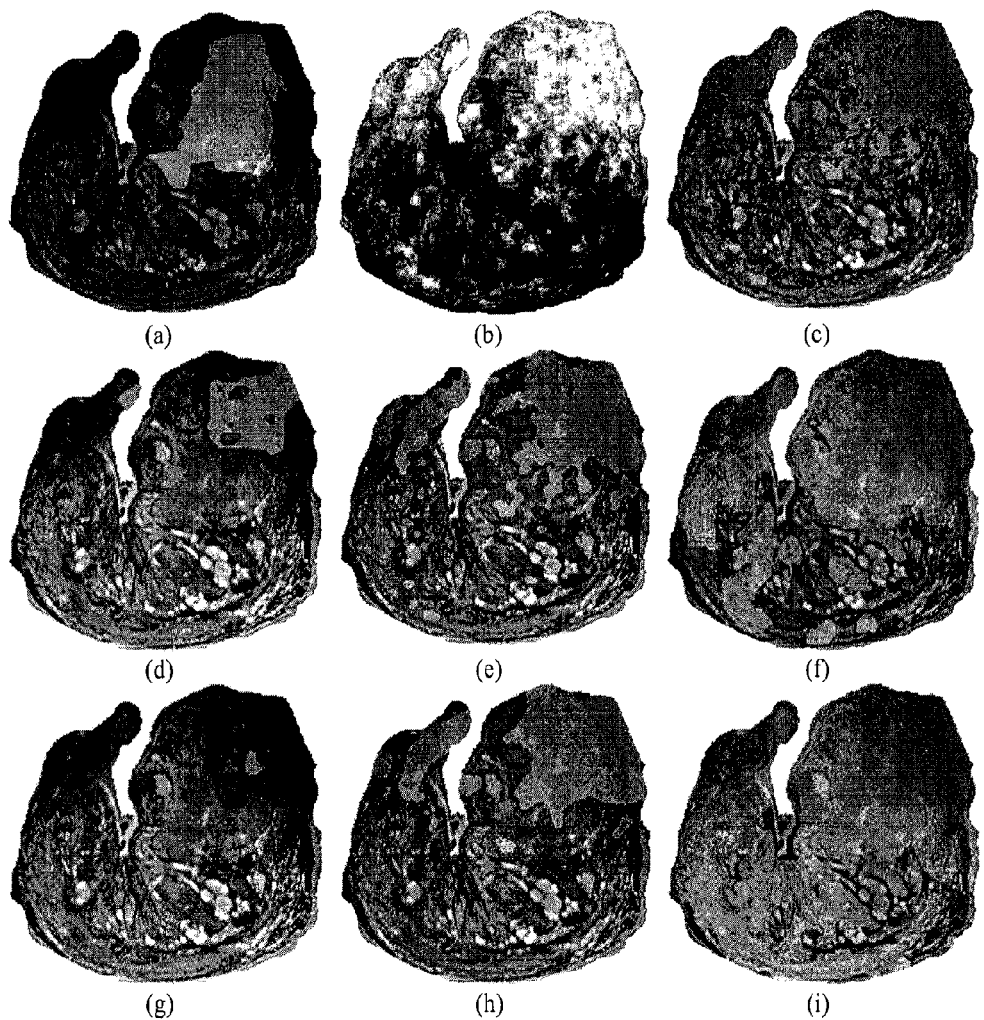
FIGURE 7. (a) T2-w MR image with cancerous region as delineated by a radiologist in green. (b) Intensities indicate the probability of cancer for each pixel assuming uniform priors. (c) Initial classification after MLE; cancerous labels shown in red. Final classification after WICM (d)-(f) and WMPMMC (g)-(i) for $\tau$ equal to 0.9, 0.55, and 0.05, respectively.

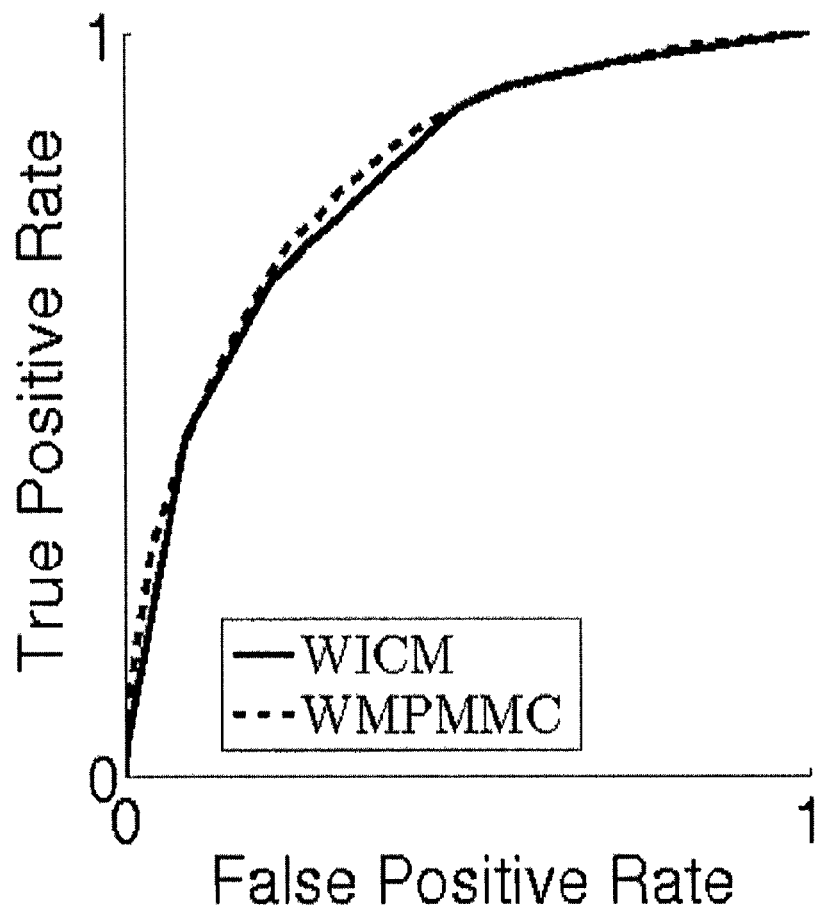
FIGURE 8. ROC curve indicates system performance over all 15 studies.

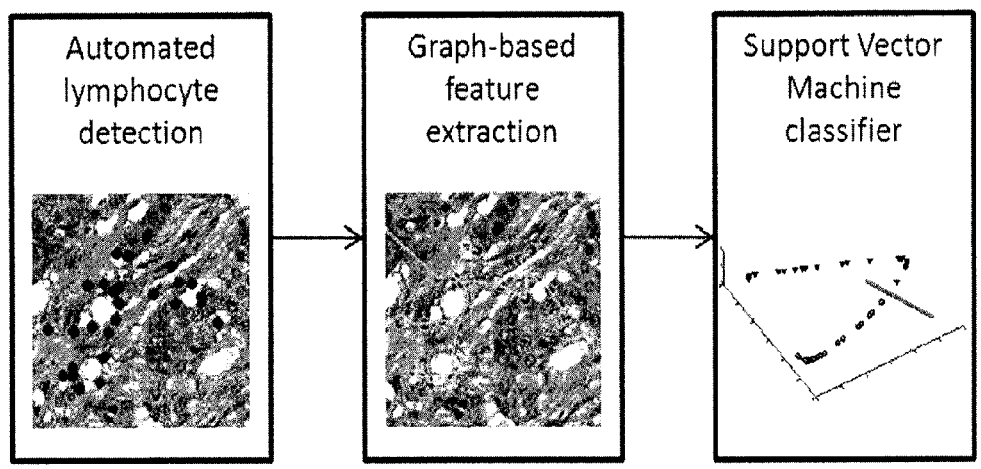

FIGURE 9. A flowchart illustrating the 3 main steps in the CADx scheme for LI-based stratification of HER2+ BC histopathology. The nuclear centroids found via the automated lymphocyte detection scheme are used to calculate 50 architectural features for each histopathology image. A Support Vector Machine classifier is used in conjunction with the architectural features to classify images based on extent of LI.

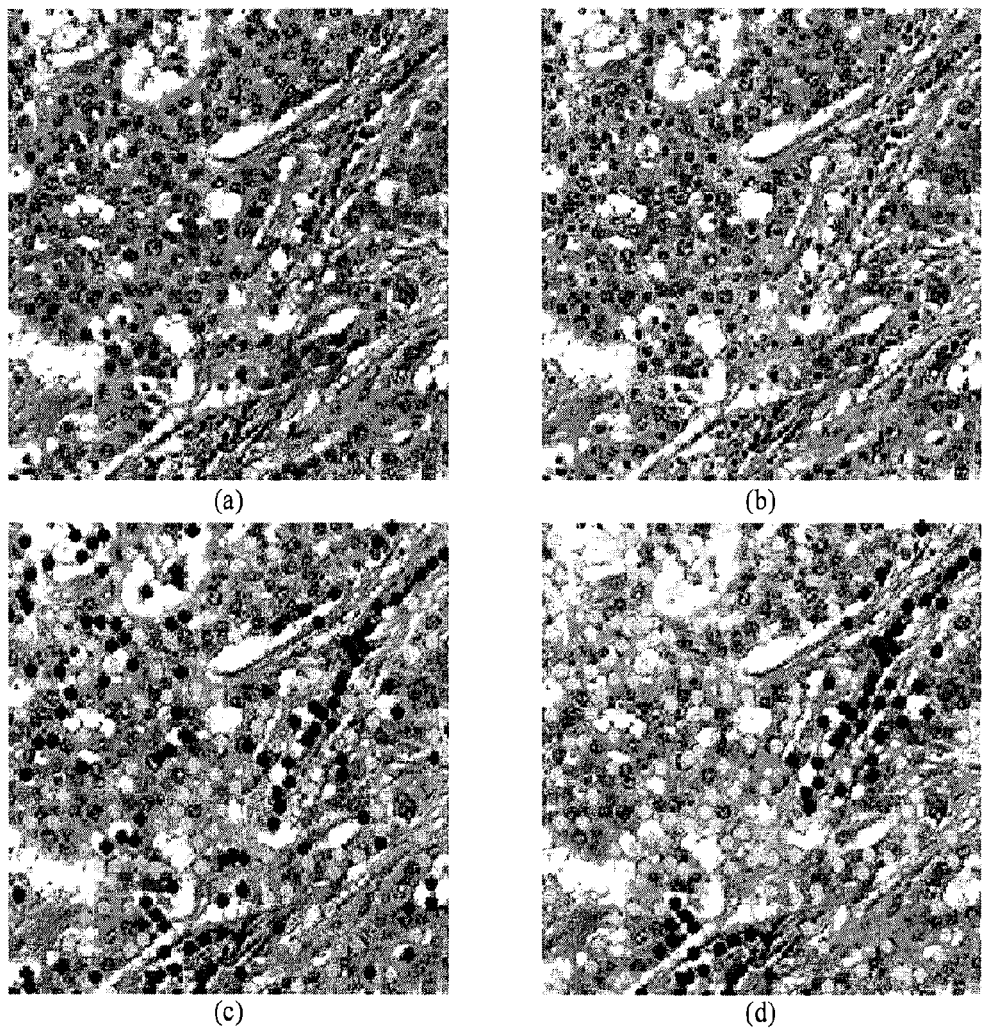
FIGURE 10. (a) Luminance channels of two different HER2+ BC histopathology studies and corresponding results for (b) initial region-growing based lymphocyte detection, (c) preliminary Bayesian refinement showing detected BC nuclei in green and detected lymphocyte nuclei in red, and (d) final lymphocyte detection result after the MRF pruning step.

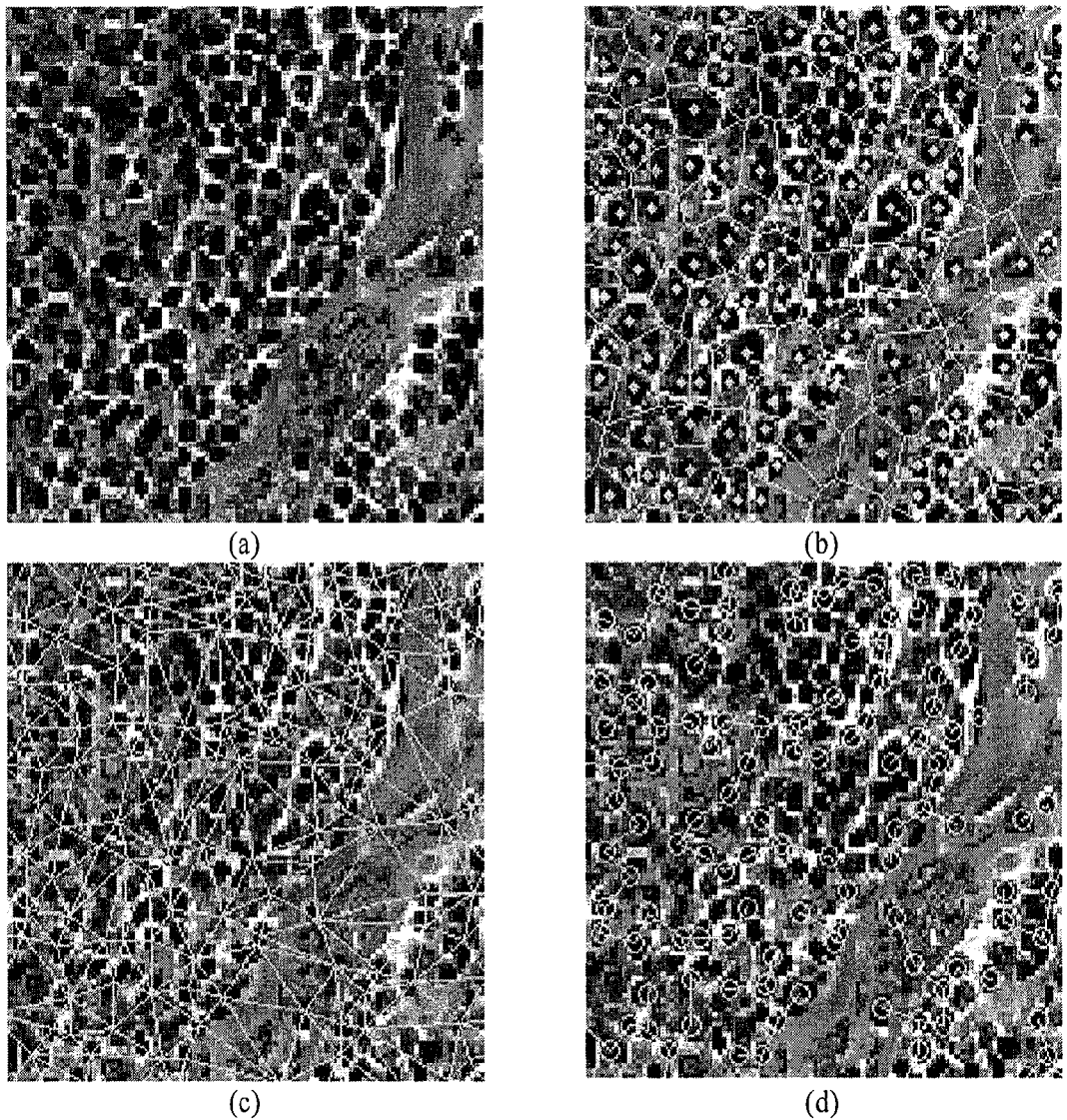
FIGURE 11. (a) HER2+ breast cancer histopathology image shown with corresponding (b) Voronoi Diagram, (c) Delaunay Triangulation, and (d) Minimum Spanning Tree constructed using the automatically detected lymphocyte centers as vertices of the graph.

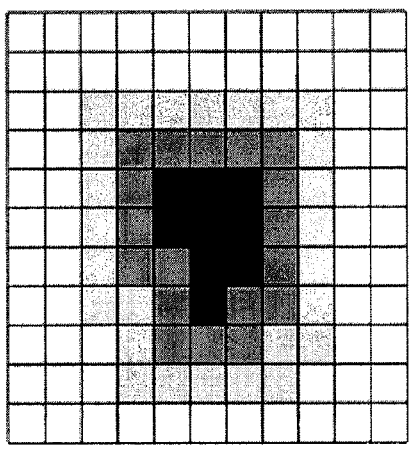
FIGURE 12. Example of current segmented region (CR), internal boundary (IB), and current boundary (CB) during a step of the region growing algorithm.

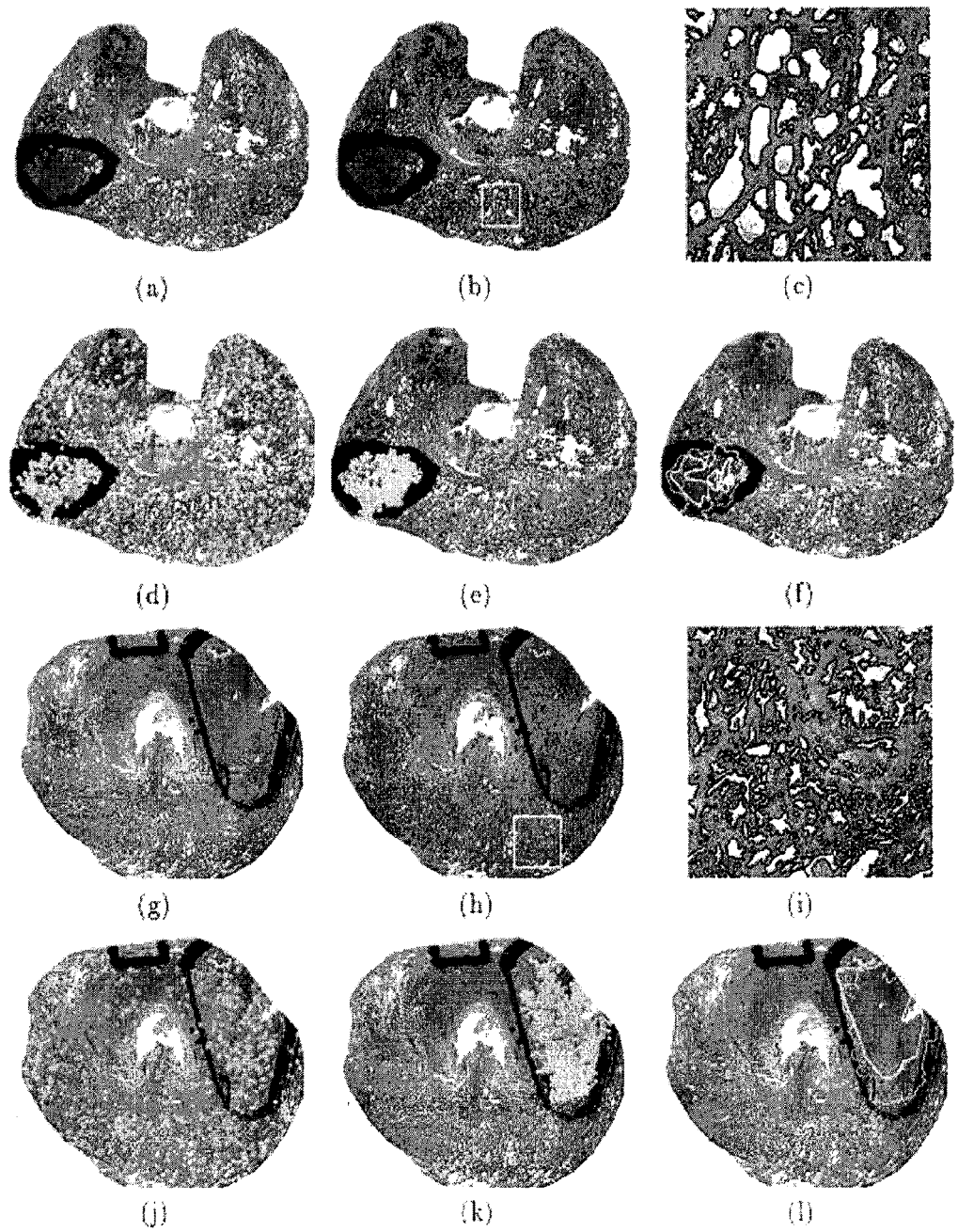
FIGURE 13. (a), (g) H&E stained prostate histology sections with black ink mark indicating RT. (b), (h) Gland segmentation boundaries. (c), (i) Magnified views of white boxes from (b), (h). Centroids of cancerous glands before (d), (j) and after (e), (k) MRF iterations. (f), (l) Estimated cancerous regions (green) with HFT (yellow).

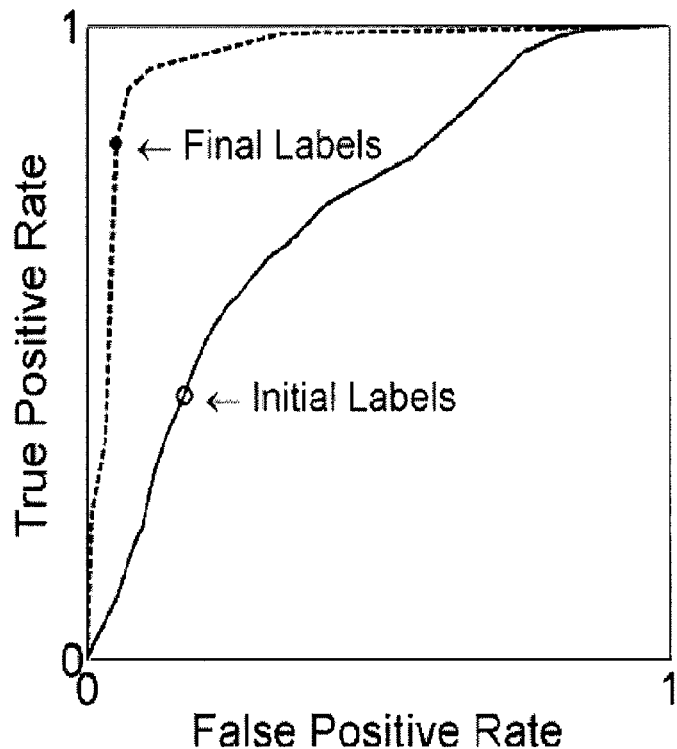

FIGURE 14. The solid ROC curve describes the performance (obtained over four studies) of the initial gland classification (without MRF) as the probability threshold $p$ varies from zero to one. The classification results at each threshold $p$ are passed to the MRF iteration, yielding the dashed ROC curve. The operating points for the qualitative results in Figure 13 are shown by the ring and dot ($p = 0.15$).

SYSTEM AND METHOD FOR ACCURATE AND RAPID IDENTIFICATION OF DISEASED REGIONS ON BIOLOGICAL IMAGES WITH APPLICATIONS TO DISEASE DIAGNOSIS AND PROGNOSIS

CROSS REFERENCE TO RELATED APPLICATIONS

This application claims priority to U.S. Provisional Patent Application No. 61/093,884 filed Sep. 3, 2008, the disclosure of which is hereby incorporated by reference in its entirety.

FIELD OF THE INVENTION

The present invention relates to a method and system for detecting, analyzing and consolidating biologically relevant structures in a hierarchical fashion, beginning at a low-resolution and proceeding to higher levels of resolution. The present invention also provides probabilistic pairwise Markov models (PPMMs) to classify these relevant structures. The invention is directed to a novel classification approach which weighs the importance of these structures. The present invention also provides a fast, efficient computer-aided detection/diagnosis (CAD) system capable of rapidly processing medical images (i.e. high throughput). The computer-aided detection/diagnosis (CAD) system of the present invention allows for rapid analysis of medical images the improving the ability to effectively detect, diagnose, and treat certain diseases.

BACKGROUND OF THE INVENTION

The examination of histological specimens obtained from core needle biopsies remains the definitive test for diagnosing prostate cancer (CaP). If cancer is present in these biopsy specimens, a surgeon may perform a radical prostatectomy (excise the prostate). Following prostatectomy, the prostate is sliced into whole-mount histological sections (WMHS). Staging and grading these WMHSs can help determine patient prognosis and treatment. Additionally, the spatial extent of CaP, as established by the analysis of WMHSs, can be registered to other modalities (eg. magnetic resonance imaging), providing a "ground truth" for the evaluation of computer-aided diagnosis (CAD) systems that operate on these modalities. The development of CAD algorithms for WMHSs is also significant for the following reasons: 1) CAD offers a viable means for analyzing the vast amount of the data present in WMHSs, a time-consuming task currently performed by pathologists, 2) the extraction of reproducible, quantifiable features can help refine our own understanding of prostate histopathology, thereby helping doctors improve performance and reduce variability in grading and detection, and 3) the data mining of quantified morphometric features may provide means for biomarker discovery, enabling, for example, the identification of patients whose CaP has a high likelihood of metastasis or post-treatment recurrence.

With respect to prostate histology, Begelman [49] presented a method for nuclei segmentation on hematoxylin and eosin (H&E) stained prostate tissue samples using a semi-supervised, fuzzy-logic engine. Adiga [50] presented a sophisticated system for the fast segmentation of cell nuclei in multispectral histological images. Doyle et al. used image texture features [51] and features derived from segmented nuclei and glands [52] to determine Gleason grade in core biopsy samples. Exploiting both domain-specific knowledge and low-level textural features, Naik et al. (References [53] and [54]) developed an automated system for segmenting glandular structures and discriminating between intermediate Gleason grades in core samples. To aid in manual cancer diagnosis, Gao [55] applied histogram thresholding to enhance the appearance of cytoplasm and nuclei. Hafiane [56] performed gland structure segmentation using a spatially constrained adaptation of fuzzy c-means and a multiphase level-set algorithm.

The most significant impediment in the development of automated systems for the analysis of MHSs is data volume. A typical whole-mount histological section digitized at 0.25 µm per pixel (equivalent to 40× magnification) contains approximately 200,000×60,000 pixels. This is 800 times the number pixels in a digitized mammogram. Consequently, nearly all previous systems (see References [84] to [95]) restrict their analysis to specific regions of interest (ROIs). These ROIs are typically less than one-thousandth the size of a WMHS. The only previous attempt—aside from our own—to identify CaP in relatively large HSs was presented by Diamond. Diamond divided a single WMHS into small 100× 100 patches, classifying each patch individually using a single Haralick feature. However, the algorithm requires manual segmentation and classification of the glands. Additionally, execution time was 5.5 hours.

Contextual information can be invaluable in estimation tasks. For example, when determining a missing word in a document, clues can be ascertained from adjacent words, words in the same sentence, and even words in other sentences. In image processing tasks such as denoising, texture synthesis, and smoothing, estimating the intensity at any single pixel is facilitated by knowledge of the remaining pixel intensities. Unfortunately, modeling contextual information may be exceedingly difficult, especially if extensive dependencies exist among all sites (a generic term representing entities such as pixels or words). However, in many systems the preponderance of contextual information regarding an individual site is contained in those sites that neighbor it. These neighborhoods are often functions of spatial or temporal proximity. Since the contextual information in such systems can be restricted to local neighborhoods, modeling the systems becomes tractable.

In a Bayesian framework, the restriction of contextual information to local neighborhoods is called the Markov property, and a system of sites that obeys this property is termed a Markov random field (MRF). The merits of MRFs have been demonstrated for a variety of computer vision tasks such as clustering, and texture synthesis. MRFs have demonstrated particular proficiency in image segmentation and object detection tasks. Zhang [33], for example, used MRFs and expectation-maximization to segment magnetic resonance (MR) brain images. Farag [34] used a similar approach to segment multimodal brain and lung images. Li [35] applied MRFs to tumor detection in digital mammography. Employing an adaptive Markov model, Awate [36] presented an unsupervised method for classifying MR brain images. In general, MRF segmentation techniques have evolved into sophisticated algorithms that employ multiresolution analysis and complex boundary models.

MRFs are established through the construction of local conditional probability density functions (LCPDFs). These LCPDFs—one centered about each site—model the local inter-site dependencies of a random process. In combination, these LCPDFs can establish a joint probability density function (JPDF) relating all sites. However, only LCPDFs of certain functional forms will reconstitute a valid JPDF. Specifically, the Gibbs-Markov equivalence theorem states that the JPDF will be valid if (and only if) it, and transitively the LCPDFs, can be represented as Gibbs distributions. Unfortunately, constructing LCPDFs that simultaneously meet the following three conditions:
1) satisfy the Markov property;
2) combine to yield a valid JPDF; and
3) sufficiently model an underlying process
is nontrivial. Consequently, current MRF models are generic and/or heuristic, and thus, ignore crucial information. Currently, the computer vision literature advocates two disparate methods for constructing LCPDFs that meet these three conditions: parametric and nonparametric modeling.

Nonparametric modeling primarily focuses on condition (3). It is assumed, though the justification seems mostly empirical, that conditions (1) and (2) will be realized during the relaxation procedure (e.g. stochastic relaxation or iterated conditional modes). For example, in the case of texture reconstruction (i.e. constructing textural images from prescribed textural patterns), the LCPDFs—whose functional forms are initially unconstrained—are estimated from training images; the reconstruction algorithm attempts to rectify these unconstrained LCPDFs to satisfy conditions 1 and 2 during the actual synthesis (reconstruction). That is, the synthesizing procedure implicitly modifies the LDCPFs during texture generation, producing (hopefully) a random texture whose LCPDFs form a valid JPDF and whose appearance resembles the original texture. Regardless of the success of this process, the rectified LCPDFs are themselves not directly accessible (though they could perhaps be estimated by sampling the synthesized texture). Additionally, since we have no insight as to the possible functional forms of the LCPDFs, we can not anticipate whether or not the rectified LCDPFs will be able to describe our specific system. This "black box" type approach removes the insight typically provided by Bayesian modeling.

Parametric methods directly address conditions (1) and (2) by exploiting the Gibbs-Markov equivalence. That is, representing the JPDF as a Gibbs distribution guarantees that the attendant LCPDFs satisfy the Markov property and form a viable JPDF. However, satisfying condition 3 within the Gibbsian framework is difficult. Since Gibbs distributions are expressed as a product of potential functions, tailoring LCPDFs to model a specific process devolves into the intelligent selection of these functions. Unfortunately, potential functions are mathematical abstractions, lacking intuition. Consequently, constructing LCPDFs through their selection becomes an ad hoc procedure, usually resulting in generic and/or heuristic models.

Random fields, which are simply collections of random variables, provide a means for performing complex classification tasks within a Bayesian framework. Markov random fields—a particular type of random field—have proven useful in a variety of applications such as segmentation, texture synthesis. However, since random fields can assume a large number of states (classes), techniques for classifying them cannot rely on exhaustive searches and must employ more sophisticated techniques. Such techniques include simulated annealing, iterated conditional modes (ICM), loopy belief propagation, and graph cuts. However, these techniques, and nearly all other such methods, perform either maximum posterior marginals (MPM) or maximum a posteriori (MAP) estimation (or a variation of the two).

The weakness of MPM and MAP estimation lies in their inability to weight certain classification decisions more heavily than others—they implicitly weight all decisions equally. This ability is crucial for two reasons. First, some tasks naturally give rise to outcomes that are asymmetrical. For example, when identifying cancerous tissue, mislabeling a malignant lesion is far more egregious than misclassifying a benign structure. Second, many classification systems require the capability of adjusting their performance. For example, the performance of commercial systems for detecting mammographic abnormalities is typically adjusted to the highest detection sensitivity that incurs no more than two false positive per image. Unfortunately, since MRFs are restricted to MPM and MAP estimation, they are ill suited for such tasks.

Though others have addressed these problems [See References 1-10], they have used approaches that leverage low-level features (e.g. Haralick, wavelet, fractal). These features require extensive processing time, precluding the ability to analyze large images such as those found in histological analysis.

BRIEF SUMMARY OF INVENTION

The present invention relates to a method and system for detecting biologicaily relevant structures in a hierarchical fashion, beginning at a low-resolution and proceeding to higher levels of resolution.

It is an object of the present invention to provide a system and method for detecting potentially cancerous regions in prostate histology at low-resolution.

It is an object of the present invention to provide probabilistic pairwise Markov models (PPMMs) to classify biologically relevant structures.

It is an object of the present invention to provide probabilistic pairwise Markov models (PPMMs). PPMMs formulate the LCPDFs in terms of pairwise probability density functions (PDFs), each of which models an interaction between two sites.

It is an object of the present invention to provide an automated system for detecting CaP glands in WMHSs.

In certain embodiments of the present invention, gland size alone is a sufficient feature for yielding an accurate and efficient algorithm for detecting cancerous glands.

It is an object of the present invention to provide a method for incorporating asymmetric costs into MRF estimation.

In accordance of this object, the present invention provides weighted MAP (WMAP) and weighted MPM (WMPM) estimation, generalizations of MAP and MPM estimation that allow certain decisions to be weighted more heavily than others.

In a further embodiment of the present invention, we introduce weighted ICM (WICM), a novel adaptation of ICM capable of WMAP estimation, and weighted MPM Monte Carlo (WMPMMC), an extension of MPM Monte Carlo capable of WMPM estimation.

In accordance with the above objects and others, the invention is directed in part to a system and method for detecting biologically relevant structures wherein: 1) gland segmentation is performed on the luminance channel of a color H & E stained WMHS, producing gland boundaries, 2) the system then calculates morphological features for each gland, 3) the features are classified, labeling the glands as either malignant or benign, 4) the labels serve as the starting point for the MRF iteration which then produces the final labeling, and 50 the cancerous glands are consolidated into regions.

An embodiment of the present invention provides a fast, efficient computer-aided detection/diagnosis (CAD) system capable of rapidly processing medical images (i.e. high throughput). The computer-aided detection/diagnosis (CAD) system of the present invention allows for rapid analysis of medical images the improving the ability to effectively detect, diagnose, and treat certain diseases.

The present invention is further directed to the construction of a computer-based system for identifying and assessing the biological significance of suspicious (abnormal) regions in medical images comprising segmenting and consolidating biologically relevant structures using the individual features of these structures, the features and classes of those structures that surround them, and the architectural arrangement of the structures.

In certain embodiments, the invention is directed to a method of detection/grading of malignant glands in a prostate histological section, the detection of malignant regions in prostate magnetic resonance image (MRI), or the detection of micro-calcifications in a mammogram.

In accordance with the above object and others, the invention is directed to a novel classification approach which weighs the importance of these structures.

BRIEF DESCRIPTION OF DRAWINGS

FIG. 1 depicts a graphical representation showing six sites and binary states indicating that each site has an associated feature $Y_s \in \mathbb{R}$.

FIG. 2 depicts an overview of a classification algorithm for detecting CaP glands from digitized WMHSs.

FIG. 3(a) depicts H&E stained prostate histology section; black ink mark provided by pathologist indicates CaP extent.

FIG. 3(b) depicts gland segmentation boundaries.

FIG. 3(c) depicts a magnified view of the white box depicted in FIG. 3(b).

FIG. 3(d) depicts centroids of cancerous glands before MRF iteration.

FIG. 3(e) depicts centroids of cancerous glands after MRF iteration.

FIG. 4 depicts region growing examples.

FIG. 4(a) depicts seed pixel with CB.

FIG. 4(b) depicts IB, CB, and CR at step j in the growing procedure.

FIG. 4(c) depicts IB, CB, and CR at step j+1.

FIG. 5 depicts results from gland detection algorithm.

FIGS. 5(a)-(d) depict H&E stained WMHSs.

FIGS. 5(e)-(h) depict initial labels for area=0.25.

FIGS. 5(i)-(l) depict PPMM GDS results with sensitivity adjusted to 72%.

FIGS. 5(m)-(p) depict Potts GDS results with sensitivity adjusted to 72%.

FIG. 6(a) depicts receiver operator characteristic (ROC) curves for PPMM GDS (solid) and Potts GDS (dashed) algorithms averaged over 20 trials using randomized 3-fold cross-validation. Dotted ROC curve indicates performance of initial classification based only on gland area.

FIG. 6(b) depicts area under corresponding ROC curves in FIG. 6(a) for PPMM GDS and Potts GDS.

FIG. 7(a) depicts T2-w MR image with cancerous region as delineated by a radiologist.

FIG. 7(b) depicts intensities indicate the probability of cancer for each pixel assuming uniform priors.

FIG. 7(c) depicts initial classification after MLE.

FIGS. 7(d)-(f) depict final classification after WICM for T equal to 0.9, 0.55, and 0.05, respectively.

FIGS. 7(g)-(i) depict final classification after WMPMMC for T equal to 0.9, 0.55, and 0.05, respectively.

FIG. 8 depicts ROC curve indicating system performance over 15 studies.

FIG. 9 depicts a flowchart illustrating the 3 main steps in the CADx scheme for LI-based stratification of HER2+ BC histopathology.

FIG. 10(a) depicts luminance channels of two different HER2+ BC histopathology studies.

FIG. 10(b) depicts corresponding results for initial region-growing based lymphocyte detection.

FIG. 10(c) depicts preliminary Bayesian refinement showing detected BC nuclei and detected lymphocyte nuclei.

FIG. 10(d) depicts final lymphocyte detection result after the MRF pruning step.

FIG. 11(a) depicts HER2+ breast cancer histopathology image.

FIG. 11(b) depicts corresponding Voronoi Diagram constructed using the automatically detected lymphocyte centers as vertices of the graph.

FIG. 11(c) depicts corresponding Delaunay Triangulation constructed using the automatically detected lymphocyte centers as vertices of the graph.

FIG. 11(d) depicts corresponding Minimum Spanning Tree constructed using the automatically detected lymphocyte centers as vertices of the graph.

FIG. 12 depicts an example of current segmented region (CR), internal boundary (IB), and current boundary (CB) during a step of the region growing algorithm.

FIG. 13 depicts: (a), (g) H&E stained prostate histology sections with black ink mark indicating RT. (b), (h) Gland segmentation boundaries. (c), (i) Magnified views of white boxes from (b), (h). Centroids of cancerous glands before (d), (j) and after (e), (k) MRF iterations. (f), (i) Estimated cancerous regions (green) with HFT (yellow).

FIG. 14 depicts a solid ROC curve that describes the performance (obtained over four studies) of the initial gland classification (without MRF) as the probability threshold ρ varies from zero to one.

DETAILED DESCRIPTION OF INVENTION

In accordance with the above objects and others, the invention is directed in part to a system and method for detecting biologically relevant structures wherein: 1) biologically relevant structures are identified and segmented, 2) morphological (and possibly other) features are extracted from the segmentations, 3) the segmented structures are classified using an MRF, and 4) similarly classified structures are consolidated into regions.

In accordance with the above objects and others, the invention is directed in part to a system and method for detecting biologically relevant structures wherein: 1) gland segmentation is performed on the luminance channel of a color H & E stained WMHS, producing gland boundaries, 2) the system then calculates morphological features for each gland, 3) the features are classified, labeling the glands as either malignant or benign, 4) the labels serve as the starting point for the MRF iteration which then produces the final labeling, and 50 the cancerous glands are consolidated into regions. The system and method of the present invention can be applied to the analysis of variety of organs (including, but not limited to, ovarian, bladder, cervical, rectal, breast) imaged using a variety of modalities (including, but not limited to, ultrasound, radiography, PET, CT).

An embodiment of the present invention is directed to a system specifically designed to operate at low-resolution (0.008 mm per pixel) which will eventually constitute the initial stage of a hierarchical analysis algorithm, identifying areas for which a higher-resolution examination is necessary. A hierarchical methodology provides an effective means for analyzing high density data. Even at low resolutions, gland size and morphology are noticeably different in cancerous and benign regions.

An embodiment of the present invention is directed to probabilistic pairwise Markov models (PPMMs). PPMMs formulate the LCPDFs in terms of pairwise probability density functions (PDFs), each of which models an interaction between two sites. They allow the creation of relatively sophisticated LCPDFs, increasing our ability to model complex processes. Furthermore, since the pairwise probabilities have meaningful interpretations, the functional forms, modeling capabilities, and expected behavior of the available LCPDFs become more apparent. Thus, PPMMs obviate the need for ad hoc representations and return the construction of the LCPDFs to the familiar Bayesian framework.

An embodiment of the present invention is directed to a method of detection/grading of malignant wherein the initial stage of a hierarchical analysis algorithm indicates those areas for which a higher-resolution examination is necessary. At the proposed resolution the predominately visible structures are the glands. Gland size and morphology are noticeably different in cancerous and benign regions, even at low-resolution. In cancerous areas the glands tend to be smaller than those found in benign regions. Also, cancerous glands tend to be proximate to other cancerous glands. This information is included using Markov random fields (MRFs). However, unlike the preponderance of MRF strategies which rely on heuristic formulations, we introduce a straight-forward, mathematically rigorous formulation that allows the MRF to be modeled directly from the data. The cancerous glands are then formed into regions. The methodology of the present invention can be applied to a variety of gland based features and proximity measures. Accordingly, the system and method of the present invention can be used to assist pathologists in examination of histological sections and/or as an independent means of assessment.

In a preferred embodiment, the present invention incorporates analysis of gland structure on low resolution images as the initial stage of a hierarchical approach to detection and grading of prostate cancer, rapid segmentation of gland boundaries and morphological features, and integration of probability distributions into the Markov Random Fields framework, allowing the interactions between neighboring glands to be modeled probabilistically.

The invention is described more fully herein. All references cited are hereby incorporated by reference in their entirety herein.

Review of Markov Random Fields

Random Field Nomenclature

Let the set $S=\{1, 2, \ldots, N\}$ reference N sites to be classified. Each site $s \in S$ has two associated random variables: $X_s \in \Lambda$ indicating its state (class) and $Y_s \in \mathbb{R}^D$ representing its D-dimensional feature vector. Particular instances of $X_s$ and $Y_s$ are denoted by the lowercase variables $x_s \in \Lambda$ and $y_s \in \mathbb{R}^D$. Let $X=(X_1, X_2, \ldots, X_N)$ and $Y=(Y_1, Y_2, \ldots, Y_N)$ refer to all random variables $X_s$ and $Y_s$ in aggregate. The state spaces of X and Y are the Cartesian products $\Omega=\Lambda^N$ and $\mathbb{R}^{D \times N}$. Instances of X and Y are denoted by the lowercase variables $x=(x_1, x_2, \ldots, x_N) \in \Omega$ and $y=(y_1, y_2, \ldots, y_N) \in \mathbb{R}^{D \times N}$.

Let $G=\{S, E\}$ establish an undirected graph structure on the sites, where S and E are the vertices (sites) and edges, respectively. A clique c is any subset of S which constitutes a fully connected subgraph of G, i.e. each site in c shares an edge with every other site. The set $\mathcal{C}$ contains all possible cliques. A neighborhood $\eta_s$ is the set containing all sites that share an edge with s, i.e. $\eta_s=\{r: r \in S, r \neq s, \{r,s\} \in E\}$. If P is a probability measure defined over $\Omega$ then the triplet $(G, \Omega, P)$ is called a random field.

These concepts are best understood in the context of an example. The graph in FIG. 1 has sites $S=\{1, 2, 3, 4, 5, 6\}$ and edges $E=\{\{1, 2\}, \{1, 4\}, \{1, 5\}, \{2, 3\}, \{2, 6\}, \{4, 5\}\}$. The neighborhood of site 5, for example, is $\eta_5=\{1, 4\}$. There are six one-element cliques $\mathcal{C}_1=\{\{1\}, \{2\}, \{3\}, \{4\}, \{5\}, \{6\}\}$, six two-element cliques $\mathcal{C}_2=E$, and one three-element clique $\mathcal{C}_3=\{\{1, 4, 5\}\}$. The set $\mathcal{C}$ is the union of $\mathcal{C}_1$, $\mathcal{C}_2$, and $\mathcal{C}_3$. The set of possible states for each $X_s$ is $\Lambda=\{b, w\}$, where b and w represent black and white, respectively. The random variable $Y_s \in \mathbb{R}$ reflects the diameter of site s. For this example we have $x=(w, b, b, b, w, b)$ and $y=(0.9, 1.5, 1.6, 1.4, 1.1, 1.3)$.

Finally, we establish a convention for representing probabilities. Let $P(\bullet)$ indicate the probability of event $\{\bullet\}$. For instance, $P(X_s=x_s)$ and $P(X=x)$ signify the probabilities of the events $\{X_s=x_s\}$ and $\{X=x\}$. Whenever appropriate we will simplify such notations by omitting the random variable, e.g. $P(x) \equiv P(X=x)$. Let $p(\bullet)$ represent a probability PDF; for example, $p_g$ might indicate a Gaussian PDF. The notations $P(\bullet)$ and $p(\bullet)$ are useful in differentiating $P(x_s)$ which indicates the probability that $\{X_s=x_s\}$ from $p_g(x_s)$ which refers to the probability that a Gaussian random variable assumes the value $x_s$.

Maximum a Posteriori Estimation

Given an observation of the feature vectors Y we would like to estimate the states X. The preferred method is maximum a posteriori (MAP) estimation which entails maximizing the following quantity over all $x \in \Omega$:

$$P(x \mid y) = \frac{P(y \mid x)P(x)}{P(y)} \propto P(y \mid x)P(x). \quad (2.2.1)$$

The first term in (2.2.1) reflects the influence of the feature vectors. It can be simplified by assuming that all $Y_s$ are conditionally independent and identically distributed given their associated $X_s$. This assumption implies that if the class $X_s$ of site s is known then 1) the classes and features of the remaining sites provide no additional information when estimating $Y_s$ and 2) the conditional distribution of $Y_s$ is identical for all $s \in S$. As a result we have $$P(y \mid x) = \prod_{s \in S} P(y_s \mid x_s) \quad (2.2.2)$$
$$= \prod_{s \in S} p_f(y_s \mid x_s),$$

where the use of the single PDF $p_f$ indicates that $P(y_s|x_s)$ is identically distributed across S. The second term in (2.2.1) reflects the influence of the class labels. In general, modeling this high-dimensional PDF is intractable. However, if the Markov property is assumed its formulation simplifies. This is the topic of the following subsections.

Random Fields and the Markov Property

The random field $(G, \Omega, P)$ is a Markov Random Field (MRF) if its local conditional probability density functions satisfy the Markov property:

$$P(x_s|x_{-s})=P(x_s|x_{\eta_s}), \quad (2.3.1)$$

where $x_{-s}=(x_1, \ldots, x_{s-1}, x_{s+1}, \ldots, x_N)$, $x_{\eta_s}=(x_{\eta_s(1)}, \ldots, x_{\eta_s(|\eta_s|)})$, $\eta_s(i) \in S$ is the $i^{th}$ element of the set $\eta_s$, and $|\eta_s|$ is the cardinality of $\eta_s$. Thus, the Markov property simplifies the forms of the LCPDFs.

Given the LCPDFs for all $s \in S$ we can uniquely recover the corresponding joint probability density function P(x) using Brook's Lemma. However, it is unlikely that a group of arbitrarily selected LCPDFs will be consistent in the sense that they define a valid JPDF. That is, consistent LCPDFs are limited to certain functional forms. The Hammersley-Clifford theorem establishes the functional forms of LCPDFs that are both consistent and satisfy the Markov property.

Gibbs Markov Equivalence

The connection between the Markov property and the JPDF of X is revealed by the Hammersley-Clifford (Gibbs-Markov equivalence) theorem. This theorem states that a random field (G, $\Omega$, P) with P(x)>0 for all $x \in \Omega$ satisfies the Markov property if and only if it can be expressed as a Gibbs distribution:

$$P(x) = \frac{1}{Z} \prod_{c \in \mathcal{C}} V_c(x), \quad (2.4.1)$$

where $Z = \sum_{x \in \Omega} \prod_{c \in \mathcal{C}} V_c(x)$ is the normalizing constant and $V_c$ are positive functions, called clique potentials, that depend only on those $x_s$ such that $s \in c$. The following derivation reveals the simplified forms of the LCPDFs:

$$P(x_s \mid x_{-s}) = \frac{P(x)}{\sum_{\lambda \in \Lambda} P(X_s = \lambda, X_{-s} = x_{-s})}$$

$$= \frac{\prod_{c \in \mathcal{C}_{-s}} V_c(x) \prod_{c \in \mathcal{C}_s} V_c(x)}{\prod_{c \in \mathcal{C}_{-s}} V_c(x) \sum_{\lambda \in \Lambda} \prod_{c \in \mathcal{C}_s} V_c (x_1, \ldots, x_{s-1}, \lambda, x_{s+1}, \ldots, x_N)}$$

$$= \frac{\prod_{c \in \mathcal{C}_s} V_c(x)}{\sum_{\lambda \in \Lambda} \prod_{c \in \mathcal{C}_s} V_c(x_1, \ldots, x_{s-1}, \lambda, x_{s+1}, \ldots, x_N)}$$

$$= P(x_s \mid x_{\eta_s}),$$

where $\mathcal{C}_s$ represents $\{c \in \mathcal{C} : s \in c\}$ and $\mathcal{C}_{-s}$ represents $\{c \in \mathcal{C} : s \notin c\}$. This derivation also proves that all Gibbs systems are Markovian.

Probabilistic Pairwise Markov Models

In this section we introduce a means for constructing consistent LCPDFs using probability density functions instead of potentials. We refer to the resulting MRFs as probabilistic pairwise Markov models (PPMMs). We then demonstrate how both Gaussian MRFs and MRFs based on the Potts model can be interpreted as PPMMs. Finally, we compare PPMMs to a subset of MRFs called strong-MRFs.

A PPMM whose pairwise PDFs are modeled as Gaussian distributions will produce a Gaussian MRF (i.e. a MRF whose LCPDFs and JPDFs are Gaussian distributions). These PDFs need not be Gaussian; they can assume any bivariate distribution (e.g. Gamma, exponential, Poisson). This allows the creation of relatively sophisticated LCPDFs, increasing our ability to model complex processes. Furthermore, since the pairwise probabilities have meaningful interpretations, the functional forms, modeling capabilities, and expected behavior of the available LCPDFs become more apparent. Thus, the PPMMs of the present invention obviate the need for ad hoc representations and return the construction of the LCPDFs to the familiar Bayesian framework.

Assumptions and Derivations

We begin by invoking two prevalent assumptions. First, we assume that only the pairwise dependencies among sites are significant. Second, we assume that the LCPDFs are stationary, i.e. $P(x_s|x_{\eta_s})$ is identical for each site $s \in S$ having $m=|\eta_s|$ neighbors. With these assumptions (2.4.2) simplifies to the following:

$$P(x_s \mid x_{\eta_s}) = \frac{V_1(x_s) \prod_{r \in \eta_s} V_2(x_s, x_r)}{\sum_{\lambda \in \Lambda} V_1(\lambda) \prod_{r \in \eta_s} V_2(\lambda, x_r)}, \quad (3.1.1)$$

where $V_1$ and $V_2$ are the site-invariant potential functions for one- and two-element cliques, respectively. Furthermore, $V_2$ is symmetric in the sense that $V_2(x_s, x_r) = V_2(x_r, x_s)$; this symmetry is needed to ensure the stationarity of $P(x_s|x_{\eta_s})$ across all possible lattice structures. (For regular lattices, such as rectangular grids, $V_2$ need not be symmetric.)

Before continuing we introduce a new notation. Let $p_{0|m}(x_s|x_{\eta_s})$ represent the stationary distribution $P(x_s|x_{\eta_s})$ for all $s \in S$ such that $m=|\eta_s|$. The naming convention motivating $p_{0|m}$ results from considering s as stationary site 0 and its neighbors $\eta_s$ as stationary sites 1 ... M. This same convention will be used to represent other distributions involving these m+1 sites. For example, $p_{3|0}$ reflects the conditional probability of the state of stationary site 3 given the state of stationary site 0.

Consider the following manipulation of $p_{0|m}$:

$$p_{0|m}(x_s \mid x_{\eta_s}) = \frac{p_{m|0}(x_{\eta_s} \mid x_s) p_0(x_s)}{\sum_{\lambda \in \Lambda} p_{m|0}(x_{\eta_s} \mid \lambda) p_0(\lambda)} \quad (3.1.2)$$

$$= \frac{p_0(x_s) \prod_{i=1}^{m} p_{i|0}(x_{\eta_s(i)} \mid x_s)}{\sum_{\lambda \in \Lambda} p_0(\lambda) \prod_{i=1}^{m} p_{i|0}(x_{\eta_s(i)} \mid \lambda)}$$

$$= \frac{p_0(x_s) \prod_{r \in \eta_s} p_{1|0}(x_r \mid x_s)}{\sum_{\lambda \in \Lambda} p_0(\lambda) \prod_{r \in \eta_s} p_{1|0}(x_r \mid \lambda)}.$$

In essence, (3.1.2) provides a means for representing $p_{0|m}$ in terms of the single pairwise distribution $p_{0,1}$, where $P_{1|0}$ and $p_0$ are a conditional and marginal distribution of $p_{0,1}$.

Furthermore, the similarities between (3.1.2) and (3.1.1), both in their forms and the assumptions used to derive them, suggest the following theorem.

Let $(G, \Omega, P)$ be a random field such that $P(X=x)>0$ for all $x \in \Omega$. If $p_{0,1}(x_s, x_r)$ is a PDF such that $p_{0,1}(x_s, x_r)=p_{0,1}(x_r, x_s)$ and $$P(x_s \mid x_{\eta_s}) = \frac{p_0(x_s) \prod_{r \in \eta_s} p_{1|0}(x_r \mid x_s)}{\sum_{\lambda \in \Lambda} p_0(\lambda) \prod_{r \in \eta_s} p_{1|0}(x_r \mid \lambda)} \quad (3.1.3)$$

for all $s \in S$, then X is a MRF.

Proof: It suffices to show that (3.1.3) can be expressed in the form given by (3.1.1). Consider the following one- and two-element potential functions:

$$V_1(x_s) = p_0(x_s)^{1-|\eta_s|}$$

and $$V_2(x_s, x_r) = p_{0,1}(x_s, x_r).$$

where the symmetry of $p_{0,1}$ ensures that $v_2$ is also symmetric. Inserting these into (3.1.1) yields $$P(x_s \mid x_{\eta_s}) = \frac{p_0(x_s)^{1-|\eta_s|} \prod_{r \in \eta_s} p_{0,1}(x_s, x_r)}{\sum_{\lambda \in \Lambda} p_0(x_s)^{1-|\eta_s|} \prod_{r \in \eta_s} p_{0,1}(\lambda, x_r)}$$

$$= \frac{p_0(x_s) \prod_{r \in \eta_s} \frac{p_{0,1}(x_s, x_r)}{p_0(x_s)}}{\sum_{\lambda \in \Lambda} p_0(x_s) \prod_{r \in \eta_s} \frac{p_{0,1}(\lambda, x_r)}{p_0(\lambda)}}$$

$$= \frac{p_0(x_s) \prod_{r \in \eta_s} p_{1|0}(x_r \mid x_s)}{\sum_{\lambda \in \Lambda} p_0(\lambda) \prod_{r \in \eta_s} p_{1|0}(x_r \mid \lambda)}.$$

Gaussian MRF as a PPMM

Consider the case of a continuous MRF where $X_s \in \Lambda = \mathbb{R}$. Let $p_{0,1}$ be a (necessarily symmetric) Gaussian distribution:

$$p_{0,1}(x_s, x_r) = \frac{\sqrt{1-\gamma^2}}{2\pi\sigma^2} \exp\left\{-\frac{1}{2\sigma^2}(x_s^2 + 2\gamma x_s x_r + x_r^2)\right\}, \quad (3.3.1)$$

where $\sigma \in \mathbb{R}^+$ and $\gamma \in [-1,1]$. Equation (3.3.1) reflects a bivariate Gaussian that has been rotated such that its principal axes coincide with the lines $x_s = x_r$ and $x_s = -x_r$, i.e. a rotation of $\pi/4$. Its requisite marginal and conditional distributions are $$p_{1|0}(x_r \mid x_s) = \frac{1}{\sqrt{2\pi\sigma^2}} \exp\left\{-\frac{1}{2\sigma^2}(x_r + 2\gamma x_s)^2\right\}$$

and

-continued $$p_0(x_s) = \sqrt{\frac{1-\gamma^2}{2\pi\sigma^2}} \exp\left\{-\frac{1-\gamma^2}{2\sigma^2} x_s^2\right\}.$$

Inserting these results into (3.1.3) yields the following:

$$P(x_s \mid x_{\eta_s}) = \sqrt{\frac{\xi}{2\pi\sigma^2}} \exp\left\{-\frac{\xi}{2\sigma^2}\left(x_s + \frac{\gamma}{\xi}\sum_{r \in \eta_s} x_r\right)^2\right\},$$

where $\xi = 1 + \gamma^2(|\eta_s| - 1)$. The LCPDFs are themselves Gaussian distributions. Thus, by designating $p_{0,1}$ as a Gaussian distribution, we have created an instance of a Gaussian MRF.

Potts Model as a PPMM

In this subsection we demonstrate how the Potts model, perhaps the most prevalent MRF formulation, can be interpreted as a PPMM. The potential functions of the Potts model are as follows:

$$V_c(x) = \begin{cases} e^\beta & \text{if } |c| = 2 \text{ and } x_r = x_s, c = \{r, s\} \\ 1 & \text{otherwise,} \end{cases} \quad (3.5.1)$$

where $\beta > 0$ (except in rare instances). Since $e^\beta > 1$, neighboring pixels with identical states will contribute more to the JPDF and their respective LCPDFs than neighboring pixels with differing states. The degree of contribution is a function of $\beta$, with greater values of $\beta$ producing "smoother" solutions. To see this, consider the MAP estimation in (2.2.1). Increasing $\beta$ increases the weight of the second term, further encouraging neighboring sites to share the same label.

The Potts model can be reformulated as a PPMM as follows:

$$p_{0,1}(x_s, x_r) = \begin{cases} \frac{e^\beta}{|\Lambda|(e^\beta + |\Lambda| - 1)} & \text{if } x_s = x_r \\ \frac{1}{|\Lambda|(e^\beta + |\Lambda| - 1)} & \text{otherwise.} \end{cases} \quad (3.5.2)$$

Note that this probability function is symmetric.

Connection to Strong-MRFs

A better understanding of PPMMs can be garnered by comparing them to strong-MRFs. Strong-MRFs are MRFs that, in addition to the Markov property, impose the following constraint: $\forall x \in \Omega, s \in S$ $$P(X_s = x_s \mid X_r = x_r : r \neq s, r \in A \subseteq S) = P(X_s = x_s \mid X_r = x_r : r \in \eta_s \cap A).$$

This states that a MRF with sites S is a strong-MRF if every $A \subseteq S$ is itself a MRF with the previous graph structure over S persisting among the remaining sites in A. In general this is not true for MRFs since removing sites (i.e. summing them out of the JPDF) usually forms new interactions (edges).

To understand the connection between PPMMs and strong-MRFs again consider a stationary MRF X with LCPDFs given by $p_{0|m}$, i.e. $P(x_s \mid x_{-s}) = p_{0|m}(x_s \mid x_{\eta_s})$. Bayes Law implies that $$\frac{P(x_s, x_{\eta s})}{P(x_{\eta s})} = \frac{p_{0,m}(x_s, x_{\eta s})}{p_m(x_{\eta s})}.$$

However, it is not necessarily true that the numerators (or denominators) are equal. This further implies that the following equality will not hold in general: $p_{0,1}(x_s, x_r) = P(x_s, x_r)$. However, this equality does hold if (and only if) X is a strong-MRF. Consequently, only when X is an strong-MRF can $p_{0,1}(x_s, x_r)$ be replaced with $P(x_s, x_r)$. The overarching principle is that two different joint distributions can share an identical conditional distribution.

Others aspects of strong-MRFs also provide insight into PPMMs. Paget's decomposition of strong-MRFs into pairwise clique probabilities agrees with our representation when X is a strong-MRF. However, our formulation remains valid when X is not a strong-MRF. Furthermore, work by Paget and Bishop has implied that the aforementioned decomposition is only possible for one- and two-element cliques. This suggests that an analogous extension of our PPMMs to higher-order cliques may not be possible.

Incorporation of Asymmetric Costs into MRF Estimation

The present invention provides a means for incorporating asymmetric costs into MRF estimation. In an embodiment of the present invention, the present invention provides weighted MAP (WMAP) and weighted MPM (WMPM) estimation; they are generalizations of MAP and MPM estimation that allow certain decisions to be weighted more heavily than others. In another embodiment of the present invention, the present invention provides weighted ICM (WICM), a novel adaptation of ICM capable of WMAP estimation, and weighted MPM Monte Carlo (WMPMMC), an extension of MPM Monte Carlo capable of WMPM estimation. Thus, the present invention can be used for any MRF optimization routine.

Review of Bayesian Risk

Given an observation of the feature vectors Y, we would like to estimate the states X. Bayesian classification advocates selecting the estimate $\hat{x} \in \Omega$ that minimizes the conditional risk (expected cost)

$$R(X|\hat{x},y) = E[C(X,\hat{x})|y] = \sum_{x \in \Omega} C(x,\hat{x}) P(x|y), \quad (5.2.1)$$

where E indicates expected value and $C(x,\hat{x})$ is the cost of selecting labels $\hat{x}$ when the true labels are x. In the following subsections we will consider the two most prevalent cost functions used with MRFs.

Maximum a Posteriori Estimation

The most ubiquitous cost function (though this cost is rarely expressed explicitly) is $$C_{MAP}(x,\hat{x}) = \Pi_{s \in S}[1 - \delta(x_s - \hat{x}_s)], \quad (5.3.1)$$

where $\delta$ is the Kronecker delta. Thus, a cost of 1 is incurred if one or more sites are labeled incorrectly. Inserting (5.3.1) into (5.2.1) yields $$R_{MAP}(X | \hat{x}, y) = \sum_{x \in \Omega} \left( \prod_{s \in S} [1 - \delta(x_s - \hat{x}_s)] \right) P(x | y) \quad (5.3.2)$$

$$= 1 - P(\hat{x} | y).$$

Minimizing (5.3.2) over $\hat{x}$ is equivalent to maximizing the second term. Thus, we have maximum a posteriori (MAP) estimation, which advocates selecting the $\hat{x}$ that maximizes the a posteriori probability.

When the cardinality of $\Omega$ is small the search for the optimal $\hat{x}$ can be determined by testing all possible states. Since this is rarely the case, other means become necessary. Simulated annealing is an effective stochastic relaxation method. Unfortunately, its high computation complexity diminishes its usefulness. A far less computationally intensive and more popular technique is iterated conditional modes (ICM), a deterministic relaxation scheme. The ICM algorithm is predicated on the following reformulation of the a posteriori probability:

$$P(x|y) = P(x_s | x_{-s}, y) P(x_{-s} | y) \quad (5.3.3)$$

Increasing the first term in (5.3.3) necessarily increases $P(x|y)$. This suggests a global optimization strategy that sequentially visits each site $s \in S$ and determines the label $x_s \in \Lambda$ that maximizes $P(x_s | x_{-s}, y)$. ICM converges to a local, and not global, maximum of $P(x|y)$; however, in many situations the local maximum is more appropriate. The ICM algorithm is as follows:

---

Iterated Conditional Modes
Input: Initial labeling $x^0$
Output: Final labeling $x^k$ after iteration k
1.    k = 0
2.    do
3.       k = k + 1
4.       $x^k = x^{k-1}$
5.       for $\forall s \in S$ do
6.          $\chi_s^k = \arg\max_{\omega \in \Lambda} P(X_s = \omega | x_{\eta_s}^k, y_s)$
7.       end for
8.    while $x^k \neq x^{k-1}$

---

Typically, the initial labeling $x^0$ is provided by the maximum likelihood estimate of $P(y|x)$. This probability becomes tractable under the typical assumption that all $Y_s$ are conditionally independent given their corresponding $X_s$, i.e. $P(y|x) = \Pi_{s \in S} P(y_s | x_s)$. The ICM iteration usually converges in approximately six or seven iterations.

Maximum Posterior Marginals

As an alternative to MAP estimation, Marroquin suggested using the following cost function $$C_{MPM}(x,\hat{x}) = \Sigma_{s \in S}[1 - \delta(x_s - \hat{x}_s)]. \quad (5.4.1)$$

This function counts the number of sites in $\hat{x}$ that are mislabeled. Inserting (5.4.1) into (5.2.1) yields $$R_{MPM}(X | \hat{x}, y) = \sum_{x \in \Omega} \left( \sum_{s \in S} [1 - \delta(x_s - \hat{x}_s)] \right) P(x | y) \quad (5.4.2)$$

$$= \sum_{s \in S} \sum_{x \in \Omega} P(x | y) - \sum_{s \in S} \sum_{x \in \Omega} \delta(x_s - \hat{x}_s) P(\hat{x} | y)$$

$$= |S| - \sum_{s \in S} P(\hat{x}_s | y).$$

The distributions $P(x_s | y)$ are called the posterior marginals. Minimizing (5.4.2) is equivalent to independently maximizing each of these posterior marginals with respect to its corresponding $\hat{x}_s$. Hence, this type of estimation is termed maximum posterior marginals (MPM).

Since the cardinality of $\Omega$ is usually large, $P(\hat{x}_s|y)$ can not be evaluated directly; and consequently, Marroquin proposed using a Monte Carlo method—MPM Monte Carlo (MPMMC). The basic rationale for his approach is as follows: Stochastic relaxation schemes such as the Metropolis algorithm Metropolis 1953 or the Gibbs Sampler form Markov chains whose equilibrium distribution is $P(x|y)$. Consider the following algorithm for the Gibbs Sampler:

```
Gibbs Sampler
Input: Initial labeling x⁰
Output: Final labeling xᵏ after iteration k
1.      k = 0
2.      do
3.          k = k + 1
4.          xᵏ = xᵏ⁻¹
5.          for ∀ s ∈ S do
6.              sample xₛᵏ from P(Xₛ = ω|x₋ₛᵏ, yₛ)
7.          end for
8.      while k < ∞
```

In theory, the final labels $x^k$, which represent a sample from the distribution $P(x|y)$, are independent of the starting conditions $x^0$. However, since this algorithm must eventually terminate, some dependence upon initial conditions does exist. As with ICM, $x^0$ is typically initialized to the MLE. Determining the number of iterations 1 needed for the Markov chain to reach equilibrium will depend upon the distribution $P(x|y)$. This is usually chosen in an ad hoc fashion. It is worth mentioning that the only difference between ICM and the Gibbs sampler (other than the termination criterion) occurs in step 6: ICM chooses the label that maximizes $P(x_s^k|x_{-s}^k,y_s)$, the Gibbs sampler selects the label randomly from this distribution.

After reaching equilibrium the amount of time the chain spends in any state x is given by $P(x|y)$. Thus, the posterior marginal $P(x_s|y)$ can be estimated as follows:

$$P(X_s = \omega \mid y) \approx \frac{1}{m-l}\sum_{k=l}^{m} \delta(x_s^k - \omega), \quad (5.4.3)$$

where m−l is a number of iterations past equilibrium needed to generate an accurate estimate. The value for m, like l, is typically chosen empirically. Given this estimate of $P(x_s|y)$, the maximizer can be determined by testing all possible states of $x_s$.

Weighted Maximum a Posteriori Estimation

MAP estimation weights each classification decision equally. In this section we generalize MAP estimation to allow for asymmetric costs. However, before continuing we first introduce several definitions that will prove useful in the subsequent derivations. Let $\alpha: \Lambda \to \mathbb{R}_0^+$ define a weighting function. Let $\tilde{X}$ be a random field that differs with X only with respect to its probability measure, which is defined as follows:

$$P(\tilde{X} = x) = \frac{1}{Z}P(X = x)\prod_{s \in S}\alpha(x_s), \quad (6.1)$$

where the constant Z ensures that $\Sigma_{x \in \Omega}P(\tilde{X}=x)=1$. For convenience we will use following simplified notation: $\tilde{P}(x) \equiv P(\tilde{X}=x)$. Finally, note that (6.1) implies $$\tilde{P}(x \mid y) = \frac{1}{Z}P(x \mid y)\prod_{s \in S}\alpha(x_s). \quad (6.2)$$

To allow certain classification decisions to be weighted more heavily than others $C_{MAP}$ can be generalized as follows:

$$C_{WMAP}(x,\hat{x})=\Pi_{s \in S}\alpha(x_s)[1-\delta(x_s-\hat{x}_s)]. \quad (6.3)$$

Consequently, if the estimate $\hat{x}$ contains any erroneous labels it accrues a cost of $\Pi_{s \in S}\alpha(x_s)$. Inserting (6.3) into (5.2.1) yields $$\begin{aligned}R_{WMAP}(X \mid \hat{x}, y) &= \sum_{x \in \Omega}\left(\prod_{s \in S}\alpha(x_s)[1-\delta(x_s-\hat{x}_s)]\right)P(x \mid y) \\ &= \sum_{x \in \Omega}\left(\prod_{s \in S}[1-\delta(x_s-\hat{x}_s)]\right)\prod_{s \in S}\alpha(x_s)P(x \mid y) \\ &= \sum_{x \in \Omega}\left(\prod_{s \in S}[1-\delta(x_s-\hat{x}_s)]\right)Z \cdot \tilde{P}(x \mid y) \\ &= Z \cdot R_{MAP}(\tilde{X} \mid \hat{x}, y). \end{aligned} \quad (6.4)$$

This result indicates that minimizing $R_{WMAP}(X|\hat{x},y)$ is equivalent to minimizing $R_{MAP}(\tilde{X}|\hat{x},y)$; and consequently, the optimal labeling is the MAP estimate of $\tilde{X}$. Since the a posteriori probability of $\tilde{X}$ corresponds to the weighted a posteriori probability of X, we refer to this type of estimation as weighted MAP (WMAP) estimation. Note that if $\alpha(x_s) \equiv 1$, WMAP estimation reduces to MAP estimation.

Implementing the WMAP estimation of X is trivial: we simply perform MAP estimation on $\tilde{X}$. Consequently, we are free to use any MAP estimation scheme available for MRFs. For example, consider this following explicit implementation of WMAP using weighted ICM (WICM), an adaptation of ICM:

```
Weighted Iterated Conditional Modes
Input: Initial labeling x⁰, weights α(ω)
Output: Final labeling xᵏ after iteration k
1.      k = 0
2.      do
3.          k = k + 1
4.          xᵏ = xᵏ⁻¹
5.          for ∀ s ∈ S do
6.              χₛᵏ = arg maxω∈Λ [α(ω)P(Xₛ = ω|x₋ₛᵏ, yₛ)]
7.          end for
8.      while xᵏ ≠ xᵏ⁻¹
```

Modifying ICM to perform WMAP estimation only requires replacing $P(x_s|x_{-s},y_s)$ with $\tilde{P}(x_s|x_{-s},y_s)$. Recognizing that $\tilde{P}(x_s|x_{-s},y_s) \propto \alpha(x_s)P(x_s|x_{-s},y_s)$ reveals the final form used in step 6.

Weighted Maximum Posterior Marginals

In this section we introduce a means for modifying MPM to allow certain classes to be weighted more heavily than others. We call the modified estimation scheme weighted MPM (WMPM). We begin by deriving WMPM. We then demonstrate how WMPM can be implemented using an adaption of the Monte Carlo method introduced by Marroquin. We refer to this adaptation as weighted MPM Monte Carlo (WMPMMC).

The cost function $C_{MPM}$ can be generalized as follows:

$$C_{WMPM}(x,\hat{x}) = \Pi_{r \in S} \alpha(x_r) \Sigma_{s \in S}[1-\delta(x_s-\hat{x}_s)]. \quad (7.1)$$

In this case mislabeling a site whose true label is $x_s$ has an associated cost of $\Pi_{s \in S} \alpha(x_s)$. Notice that the penalty for mislabeling site s varies depending upon the labels of the remaining sites. Though it is possible to remove these dependencies by redefining the cost function as $C_{WMPM2}(x,\hat{x}) = \Sigma_{s \in S}[1-\delta(x_s-\hat{x}_s)]$, developing a scheme to perform the necessary estimation is problematic.

Inserting (7.1) into (5.2.1) yields $$R_{WMAP}(X \mid \hat{x}, y) = \sum_{x \in \Omega}\left[\frac{\prod_{r \in S} \alpha(x_r)}{\sum_{s \in S}[1-\delta(x_s-\hat{x}_s)]}\right]P(x \mid y) \quad (7.2)$$

$$= \sum_{x \in \Omega}\left[\sum_{s \in S}[1-\delta(x_s-\hat{x}_s)]\right]\prod_{r \in S}\alpha(x_r)P(x \mid y)$$

$$\sum_{x \in \Omega}\left[\prod_{s \in S}[1-\delta(x_s-\hat{x}_s)]\right]Z \cdot \tilde{P}(x \mid y)$$

$$= Z \cdot R_{MPM}(\tilde{X} \mid \hat{x}, y),$$

Thus, the WMPM estimate of X is equivalent to the MPM estimate of $\tilde{X}$. This implies that any approach used for performing MPM estimation can be modified to perform WMPM estimation. For example, consider the WMPMMC estimation procedure. Altering this to perform WMPM estimation requires a change to the Gibbs sampler as follows:

---
Weighted Gibbs Sampler
Input: Initial labeling $x^0$, weights $\alpha(\omega)$
Output: Final labeling $x^k$ after iteration k
1.   k = 0
2.   do
3.      k = k + 1
4.      $x^k = x^{k-1}$
5.      for ∀ s ∈ S do
6.         sample $\chi_s^k$ from $(\alpha(\omega)/Z_s)P(X_s = \omega \mid x_{-s}^k, y_s)$
7.      end for
8.   while k < ∞
---

The only difference between the Gibbs sampler and the weighted Gibbs sampler is the replacement in step 6 of $P(x_s \mid x_{-s}^k, y_s)$ with $$\tilde{P}(x_s \mid x_{-s}^k, y_s) = (\alpha(\omega)/Z_s)P(x_s \mid x_{-s}^k, y_s), \quad (7.3)$$

where $Z_s$ ensures $\Sigma_{\omega \in \Lambda} \tilde{P}(\omega \mid x_{-s}^k, y_s)=1$. The remainder of the WMPMMC procedure is identical to that of the MPMMC algorithm.

Examples of Preferred Embodiments

Examples of the system and method of embodiments of the present invention are provided below. The examples show the use of PPMM and weighted MRF estimation.

In Embodiments I and II of this application, we evaluate the algorithms in the context of two MRF-based classification systems: 1) for detecting prostate cancer (CaP) in whole-mount histological sections (WMHSs) and 2) for detecting CaP in T2-weighted 3 Tesla in vivo magnetic resonance imaging (MRI). Specifically, we illustrate how WICM and WMPMMC can be used to vary classification performance, enabling the construction of receiver operator characteristic (ROC) curves.

Embodiment I

Application of PPMMs to CaP Detection on Prostate Histological Sections

In the present embodiment, we demonstrate our novel classification system for detecting cancerous glands on digitized whole-mount histological sections of the prostate. In the present embodiment of the present invention, we utilize the fact that cancerous glands tend to be proximate to other cancerous glands. This information is incorporated via a Markov random field (MRF), which we formulate using both the Potts model and the PPMM of the present invention. To demonstrate the advantages of PPMMs of the present invention over typical Markov models (specifically the Potts model), we evaluate both in the context of an algorithm to detect prostate cancer (CaP) on digitized whole-mount histological sections (WMHSs) of radical prostatectomy specimens.

We first provide a basic outline of the algorithm and then discuss each component in detail.

Algorithm Overview

FIG. 3(a) illustrates a prostate histological (tissue) section. The pinkish hue results from the hematoxylin and eosin (H&E) staining procedure. The black circle delimits the spatial extent of CaP as delineated by a pathologist; since it exists on the physical slide, it remains an indelible part of the digitized image. The numerous white regions are the lumens—holes in the prostate through which fluid flows—of secretory glands. Our system identifies CaP by leveraging two biological properties: 1) cancerous glands (and hence their lumens) tend to be smaller in cancerous compared to benign regions and 2) malignant/benign glands tend to be proximate to other malignant/benign glands.

Method

The basic algorithm, illustrated in FIG. 2, proceeds as follows: 1) The glands (or, more precisely, the gland lumens) are identified and segmented. FIG. 3(b) illustrates the segmented gland boundaries in green. FIG. 3(c) shows a magnified view of the white box in FIG. 3(b). 2) Morphological features are extracted from the segmented boundaries. Currently, we only consider one feature: glandular area. 3) A Bayesian classifier—using the distribution $p_f$ in (2.2.2) which models the glandular area—assigns a probability of malignancy to each gland. If the probability exceeds the predetermined threshold $\tau_{area}$, the gland is labeled as malignant; otherwise it is labeled benign. The blue dots in FIG. 3(d) indicate the centroids of those glands classified as malignant. 4) The MRF algorithm refines these labels, thereby enforcing the precept that nearby glands tend to share the same class. The malignant labels resulting from the MRF iteration are shown in FIG. 3(e); the blue dots indicate the centroids of those glands labeled as cancerous.

Specific Notation for CaP Detection Algorithm

We recapitulate the gland classification problem in terms of the MRF nomenclature. Let the set S={1, 2, . . . , N} reference the N glands in a WMHS. The random variable $Y_s \in \mathbb{R}$ indicates the square root of the area of gland s. The label $X_s$ of gland s is one of two possible classes: $X_s \in \Lambda \equiv \{\omega_1, \omega_2\}$, where $\omega_1$ and $\omega_2$ indicate malignancy and benignity. Two glands are neighbors if the distance between their centroids is less than 0.7 mm.

Gland Segmentation

Since color information is not needed to identify gland lumens on digitized WMHSs, all segmentation is performed using the luminance channel in CIE Lab color space. The CIE Lab color space is known to be more perceptually uniform than the RGB color space. In the luminance images glands appear as regions of contiguous, high intensity pixels circumscribed by sharp, pronounced boundaries. Our procedure to segment these glands proceeds as follows: The luminance image is convolved with a Gaussian kernel at multiple scales $\sigma_g \in \{0.2, 0.1, 0.05, 0.025\}$ mm to account for varying gland size. Peaks (maxima) in the smoothed images are considered candidate gland centers. These single pixel peaks serve as seeds for the following region growing procedure (which operates on the original image):

Step 1: Initialize the current region (CR) to the specified seed pixel and establish a $12\sigma_g \times 12\sigma_g$ bounding box centered about it. Initialize the current boundary (CB) to the 8-connected pixels neighboring CR (FIG. 4(a)).

Step 2: Identity the pixel in CB with the highest intensity. Remove this pixel from CB and add it to CR. Revise CB to include all 8-connected neighbors of the aggregated pixel which are not in CR (FIG. 4(a)-(c)).

Step 3: Define the internal boundary (IB) as all pixels in CR that are 8-connected with the pixels in CB. Compute the current boundary strength which is defined as the mean intensity of the pixels in IB minus the mean intensity of the pixels in CB.

Step 4: Repeat steps 2 and 3 until the algorithm attempts to add a pixel outside the bounding box.

Step 5: Identify the iteration step at which the maximum boundary strength was attained. Define the optimal region as CR at this step.

The final segmented regions may overlap; this is resolved by discarding the region with the lower boundary strength.

Feature Extraction, Modeling, and Bayesian Classification

Gland area is a feature known to discriminate benign from malignant glands. Since we employ a Bayesian framework, we require estimates of the conditional probability density functions of gland area for both malignant $\omega_1$ and benign $\omega_2$ glands. Using the equivalent square root of gland area (SRGA), the pdfs $p_f(y_s|\omega_1)$ and $p_f(y_s|\omega_2)$, which correspond to the PDF $p_f$ in (2.2.2), can be accurately modeled with a weighted sum of Gamma distributions:

$$g(y; \theta, k, \alpha) = \alpha y^{k_1-1} \frac{e^{-y/\theta_1}}{\theta_1^{k_1} \Gamma(k_1)} + (1-\alpha) y^{k_2-1} \frac{e^{-y/\theta_2}}{\theta_2^{k_2} \Gamma(k_2)}, \quad (9.4.1)$$

where $y > 0$ is the SRGA, $\alpha \in [0, 1]$ is the mixing parameter, $k_1, k_2 > 0$ are the shape parameters, $\theta_1, \theta_2 > 0$ are the scale parameters, and $\Gamma$ is the Gamma function. A Bayesian classifier uses these PDFs to calculate the probability of malignancy for each gland. Those glands whose probabilities exceed the predetermined threshold $\tau_{area} \in [0, 1]$ are labeled malignant; the remainder are classified as benign. The centroids of glands labeled as malignant are shown with blue dots in FIG. 2(d).

Modeling the Homogeneity of Neighboring Glands as a MRF

Probabilistic Pairwise Markov Models for Binary Classes

PPMMs require the probability $p_{0,1}$ or equivalently, $p_{1|0}$ and $p_0$. For the binary classes the general forms of these probabilities are $$p_{1|0}(x_r | x_s) = \begin{bmatrix} p_{1|0}(\omega_1 | \omega_1) & p_{1|0}(\omega_1 | \omega_2) \\ p_{1|0}(\omega_2 | \omega_1) & p_{1|0}(\omega_2 | \omega_2) \end{bmatrix} \quad (9.6.1)$$

$$= \begin{bmatrix} a & b \\ 1-a & 1-b \end{bmatrix}.$$

and $$p_0(x_s) = [p_0(\omega_1) \; p_0(\omega_2)] = [c \; 1-c]. \quad (9.6.2)$$

The required symmetry of $p_{0,1}$ necessitates that $c(1-a)=(1-c)b$, yielding $c=b/(1+b-a)$. In the case of the Potts model we have $a=e^\beta/(1+e^\beta)$, $b=1/(1+e^\beta)$, and $c=\frac{1}{2}$.

Values for a and b (or $\beta$ for the Potts model) can obtained from training data. Though (9.6.1) is a nonparametric distribution in the sense that there is no assumed model, the limited degrees of freedom allow the use of parametric estimation techniques. Since maximum likelihood estimation is numerically untenable for MRFs, maximum pseudo-likelihood estimation (MPLE) is the preferred alternative. MPLE maximizes the product of the LCPDFs over all samples, and unlike MLE, does not require computing the intractable normalizing factor Z.

Weighted Iterated Conditional Modes for MAP Estimation

We defined the optimal states x as those that maximize the a posteriori probability. The literature provides several means for performing this maximization. We have selected iterated conditional modes (ICM), a deterministic (as opposed to stochastic) relaxation technique. However, since our system requires the ability to favor certain classification results (i.e. misclassifying a malignant lesion is more serious than misclassifying a benign one), we must slightly adapt the ICM algorithm to incorporate this capability. Before discussing this adaptation we review the basic ICM algorithm.

ICM is based on the following reformulation of (2.2.1):

$$P(x|y) = P(x_s|x_{-s}, y) P(x_{-s}|y)$$

$$\propto P(x_s|x_{n_s}, y_s) P(x_{-s}|y). \quad (9.6.3)$$

Increasing the first term of (9.6.3) necessarily increases $P(x|y)$. Since both terms depend only on s and its neighborhood, they can be easily evaluated. This suggests a global optimization strategy that sequentially visits each site $s \in S$ and determines the label $x_s \in \Lambda$ that maximizes the first term of (9.6.3). In the case of binary classes this reduces to following decision:

$$x_s = \begin{cases} \omega_1 & \text{if } P(\omega_1 \mid x_{\eta s}, y_s) > T_{wicm} \\ \omega_2 & \text{otherwise.} \end{cases} \quad (9.6.4)$$

where $T_{wicm}=\frac{1}{2}$. Note that $P(\omega_1|x_{n_s},y_s) \propto P(y_s|x_s)P(x_s|x_{n_s})$. ICM, after several iterations, converges to a local maximum of (2.2.1). Since the maximization problem is non-convex, no realizable optimization strategy is guaranteed to identify the global maximum. However, in many situations, the local maximum is actually more appropriate.

An examination of (9.6.4) immediately suggests varying $T_{wicm}$ as a means for favoring one class over the other. As $T_{wicm}$ decreases, (9.6.4) will increasingly prefer $\omega_1$. By contrast, increasing $T_{wicm}$, will favor $\omega_2$. Since the value of $T_{wicm}$ implicitly weights the importance of each class, we refer to the modified algorithm as weighted iterated conditional modes (WICM). FIG. 3(e) illustrates the result of applying WICM to the gland labels in FIG. 3(d); the MRF prior was modeled using our PPMM. It is worth noting that the WICM algorithm can be derived in a more general and mathematically rigorous fashion using Bayesian cost functions.

Experimental Results

In this section we qualitatively and quantitatively compare the effectiveness of the PPMM and the Potts model by alternately incorporating both into the gland detection algorithm. We begin by discussing the dataset over which the CaP detection performance will be evaluated. Next we address the specific procedures used to train and test the system. Finally, we present the results and discuss their significance.

Data

The dataset consists of 20 prostate histological sections from 19 patients at two separate institutions (University of Pennsylvania and Queens University in Canada). In 13 cases the cancerous extent was delineated by a pathologist on the physical slide, and consequently, remains in the digital image. An example of this was provided in FIG. 3(a). In seven cases the CaP extent was determined after digitization. An example of this is shown in FIG. 3(c); the black line demarcating CaP extent is overlaid on the image and was not present during processing.

Experimental Design

Training

The training procedure begins by segmenting the glands in each training image and then calculating their areas and centroids. Glands whose centroids fall within the pathologist provided truth are labeled as malignant; otherwise they are labeled benign. A MLE procedure uses these labeled samples to estimate the parameters for the mixtures of Gamma distributions used to model $p_f$. The graph structure connecting the glands is determined from the gland centroids: two glands share an edge if the distance between their centroids is less than 0.7 mm. A MPLE procedure uses the graph structure and gland labels to estimate parameters for both the PPMM (a and b) and Potts model ($\beta$).

Testing

For each test image the algorithm segments the glands and then extracts their areas and centroids. The system uses these areas to determine the probability of malignancy for each gland. Those glands whose probability of malignancy is greater than $\tau_{area}=0.25$ (chosen empirically) are classified as malignant; otherwise they are classified as benign. These classification results are passed to the MRF iteration—weighted iterated conditional modes. A graph structure over the glands is established using the methodology described in the training procedure. In addition to this graph structure, the WICM algorithm requires the conditional distribution $P(x_s|x_{n_s})$; this distribution is provided by either the PPMM or Potts model. Consequently, we have two gland detection systems which we will refer to as PPMM GDS and Potts GDS. The final gland labels from both systems will depend upon the threshold $T_{wicm}$ used in the WICM alogirithm. Varying $T_{wicm}$ from zero to one will allow us to adjust classifier performance, yielding receiver operator characteristic (ROC) curves.

It is worth mentioning that classification performance could conceivably be adjusted by fixing $T_{wicm}=\frac{1}{2}$ (i.e. using ICM) and varying $\tau_{area}$. That is, since modifying $\tau_{area}$ alters the initial conditions, it can cause ICM to converge to a different local maximum of the MAP estimate. In fact, such an approach has been used elsewhere. However, the success of this methodology is predicated on the assumption that the individual modes (local maxima) of the a posteriori distribution correspond to meaningful classification results. We are aware of no justification for this argument. By contrast, the rationale governing WICM can be firmly established using Bayesian risk.

Results

Qualitative Results

The training and test sets were established using a leave-one-out strategy. The performances of the systems were varied by adjusting $T_{wicm}$ (for each algorithm independently) until their respective sensitivities approximately equaled 0.72. That is, when $T_{wicm}=0.8$ the PPMM GDS detected 72 percent of the malignant glands; to achieve the same sensitivity, the Potts GDS required $T_{wicm}=0.6$. FIGS. 5(i)-(l) show results for four histological slices using PPMM GDS. FIGS. 5(m)-(p) provide results for the same slices using the Potts GDS. The blue dots indicate the centroids of those glands labeled as malignant. The black lines enclose the spatial extent of the CaP. Both systems demonstrate remarkable proficiency, especially considering that they only examine glandular area while disregarding factors such as nuclei density, color information from the H&E staining, morphology, and glandular arrangement. Notice that every cancerous delineation (black mark) of appreciable area contains multiple detections (blue dots).

Quantitative Results

The training and testing data—which were identical for both systems—consisted of 20 independent trials using randomized 3-fold cross-validation. By varying $T_{wicm}$ from zero to one, ROC curves were generated for each trial. FIG. 6(a) illustrates the average of these ROC curves for both systems ($\tau_{area}=0.25$). The true positive rate is the ratio of malignant glands correctly classified to the total number of malignant glands. The false positive rate is the ratio of benign glands incorrectly classified to the total number of benign glands. For reference, this figure also includes the ROC curve (dotted line) indicating the classification performance if no MRF were used. That is, prior to the MRF iteration a Bayesian classifier assigns an initial probability of malignancy to each gland based solely on its area; the performance capability of this classifier varies as $\tau_{area}$ ranges from zero to one, yielding the dotted ROC curve in FIG. 6(a). FIG. 6(b) provides a bar plot of the average area under the ROC curves for the PPMM GDS (0.87) and Potts GDS (0.83) algorithms. The error bars indicate the standard error of this statistic. The difference in performance is statistically significant.

Embodiment II

CaP Detection in Multi-Protocol MRI

An embodiment of the present invention provides a classification system for detecting CaP in ex vivo MRI. This system uses T2-weighted (T2-w) 3 Tesla MRI from 15 2D slices. FIG. 7(a) illustrates a T2-w MR image; the green overlay indicates the cancerous extent as specified by a radiologist. Let the set $S=\{1, 2, \ldots, N\}$ reference the N pixels in the T2-w MR image that reside within the prostate. The random vector $Y_s \in \mathbb{R}$ represents the 21 features associated with pixel s. Each multi-dimensional distribution $f(y_s|x_s)$ (one for each class) was modeled using 21 one-dimensional histograms. The neighborhood $\eta_s$ of a pixel s is the typical 8-connected region. All results were produced using leave-one-out cross-validation.

Results

The intensities in FIG. 7(b) indicate the probability of malignancy at each pixel based solely assuming uniform priors (i.e. MLE). Those pixels labeled whose probability exceeds ½ are indicated by the red overlay in FIG. 7(c). FIGS. 7(d)-(f) illustrate the malignant labels after WICM for T equal to 0.9, 0.55, and 0.05, respectively. FIGS. 7(g)-(i) depict the results when, instead of WICM, we use WMPMMC. The black ROC curve in FIG. 8 indicates system performance over all 15 studies as T varies from 0 to 1. The AUCs for WICM and WMPMMC are 0.800 and 0.812, respectively.

Embodiment III

Detecting Lymphocytic Infiltration in Breast Histology

Breast cancer (BC) is the second leading cause of cancer-related deaths in women, with more than 182,000 new cases of invasive BC predicted in the United States for 2008 alone. Researchers have shown that the presence of lymphocytic infiltration (LI) in histopathology is a viable prognostic indicator for various cancers, including breast cancers that exhibit amplification of the HER2 gene (HER2+ BC).

An embodiment of the present invention provides a computer-aided diagnosis (CADx) scheme (FIG. 9) to automatically detect and grade the extent of LI in digitized HER2+ BC histopathology images.

Automated Lymphocyte Detection Scheme

We first attempt to identify candidate image locations that could represent centers of lymphocytic nuclei. A region-growing algorithm exploits the fact that lymphocyte nuclei in the luminance channel are identified as continuous, circular regions of low intensity circumscribed by sharp, well-defined boundaries (FIG. 10(b)). However, a number of BC nuclei are also detected (i.e. false positives) along with the lymphocyte nuclei.

The initial lymphocyte detection is refined by utilizing Maximum a Posteriori estimation to incorporate domain knowledge regarding lymphocyte size, luminance, and spatial proximity. Specifically, a Bayesian model is used in conjunction with object size and luminance to classify individual objects as either lymphocyte or BC nuclei (FIG. 10(c)).

Since LI is characterized by a high density of lymphocytes, the detection result is further refined by utilizing a Markov Random Field (MRF) model, which ensures that an object is more likely to be labeled as a lymphocyte nucleus if it surrounded by other lymphocyte nuclei. The MRF model is iterated until convergence by using an Iterated Conditional Modes algorithm (FIG. 10(d)).

Graph-Based Feature Extraction

After discarding the BC nuclei in a histopathology image, the remaining lymphocyte nuclei are used as vertices in the construction of 3 graphs, a Voronoi Diagram (FIG. 11(b)), Delaunay Triangulation (FIG. 11(c)), and Minimum Spanning Tree (FIG. 11(d)). A total of 25 graph-based features are extracted for each image. An additional 25 nuclear features are extracted directly from the lymphocyte nuclei by calculating statistics that describe the number and density of nuclei in the image. The graph-based and nuclear features are combined to create an architectural feature set of 50 features for each histopathology image.

Support Vector Machine Based Classification

For a total of 41 HER2+ BC histopathology samples, a SVM classifier is used to calculate the ability of the architectural feature set to discriminate between images with high and low levels of LI. Over 100 trials of randomized 3-fold cross-validation, the architectural features produced a mean classification accuracy of 89.71%±2.84%. For comparison, the feature extraction and classification were repeated for manually detected lymphocyte nuclei, producing a classification accuracy of 99.59%±0.92%.

The aforementioned embodiments which encompass the construction of a computer-based system capable of identifying and assessing the biological significance of suspicious (abnormal) regions/objects in medical images by segmenting and classifying them using PPMMs and weighted estimation can be extended to the analysis of variety of organs (including, but not limited to, ovarian, bladder, cervical, rectal, breast) imaged using a variety or modalities (including, but not limited to, ultrasound, radiography, PET, CT).

Embodiment IV

Detection of Prostate Cancer from Whole-Mount Histology Images Using Markov Random Fields In a certain embodiment of the present invention, our CAD algorithm proceeds as follows: 1) gland segmentation is performed on the luminance channel of a color H&E stained WMHS, producing gland boundaries, 2) the system then calculates morphological features for each gland, 3) the features are classified, labeling the glands as either malignant or benign, 4) the labels serve as the starting point for the MRF iteration which then produces the final labeling, and 5) the cancerous glands are consolidated into regions.

Methodology:
Gland Segmentation

In the luminance channel of histological images glands appear as regions of contiguous, high intensity pixels circumscribed by sharp, pronounced boundaries. To segment these regions we adopt a routine first used for segmenting breast microcalcifications[81]. We briefly outline this algorithm. First define the following:

1) current region (CR) is the set of pixels representing the segmented region in the current step of the algorithm, 2) current boundary (CB) is the set of pixels that neighbor CR in an 8-connected sense, but are not in CR, and 3) internal boundary (IB) is the subset of pixels in CR that neighbor CB. These definitions are illustrated in FIG. 12. The growing procedure begins by initializing CR to a seed pixel assumed to lie within the gland. At each iteration CR expands by aggregating the pixel in CB with the greatest intensity. CR and CB are updated, and the process continues. The algorithm terminates when the $L_\infty$ norm from the seed to the next aggregated pixel exceeds a predetermined threshold. That is, the $L_\infty$ norm establishes a square bounding box about the seed; the growing procedure terminates when the algorithm attempts to add a pixel outside this box. During each iteration the algorithm measures the boundary strength which is defined as the average intensity of the pixels in IB minus the average intensity of the pixels in CB. After the growing procedure terminates, the region with the greatest boundary strength is selected. Seed pixels are established by finding peaks in the image after Gaussian smoothing. Since gland sizes can vary greatly, we smooth at multiple scales, each of which is defined by the sigma $\sigma_g \in \{0.2, 0.1, 0.05, 0.025\}$ mm of a Gaussian kernel. The growing procedure operates on the original image. The length l of each side of the bounding box used for terminating the segmentation step is tied to the scale: $l=12\sigma_g$. The final segmented regions may overlap. In this event the region with the highest boundary measure is retained.

FIGS. 13(a) and 13(g) are H&E stained WMHSs with black ink marks providing a rough truth (RT) of CaP extent. Gland segmentation results are shown in FIGS. 13(b) and 13(h). FIGS. 13(c) and 13(i) provide magnified views of the regions of interest in FIGS. 13(b) and 13(h). The centroids of glands whose probability of malignancy exceeds $\rho=0.15$ are marked with green dots in FIGS. 13(d) and 13(j). This labeling is refined by the MRF iteration, producing the gland centroids shown in FIGS. 13(e) and 13(k). FIGS. 13(f) and 13(l) show the aggregation of cancerous glands into regions (green) along with a high-fidelity truth (HFT) of CaP extent (yellow).

Feature Extraction, Modeling, and Bayesian Classification

Gland area is used to discriminate benign from malignant glands. Since we employ a Bayesian framework, we require estimates of the conditional probability density functions (pdfs) of gland area for both malignant $\omega_m$, and benign $\omega_b$ glands. Using the equivalent square root of gland area (SRGA), the pdfs $f(y|\omega_m)$ and $f(y|\omega_b)$ can be accurately modeled with a weighted sum of gamma distributions:

$$f(y; \theta, k, \lambda) = \lambda y^{k_1-1} \frac{e^{-y/\theta_1}}{\theta_1^{k_1} \Gamma(k_1)} + (1-\lambda) y^{k_2-1} \frac{e^{-y/\theta_2}}{\theta_2^{k_2} \Gamma(k_2)}, \quad (10)$$

where y>0 is the SRGA, $\lambda \in [0, 1]$ is the mixing parameter, $k_1, k_2>0$ are the shape parameters, $\theta_1, \theta_2>0$ are the scale parameters, and $\Gamma$ is the Gamma function. Note, we use f to indicate a continuous pdf and p to denote a discrete probability mass function (pmf). A Bayesian classifier uses these pdfs to calculate the probability of malignancy for each gland. Those glands whose probabilities exceed the predetermined threshold $\rho$ are labeled malignant; the remainder are classified as benign (FIGS. 13(d) and 13(j)).

Improved Classification Using Markov Random Fields

In addition to glandular features such as area, a highly indicative trait of cancerous glands is their proximity to other cancerous glands. This can be modeled using MRFs.

Formulation of Gland Proximity as a MRF

Let $S=\{s_1, s_2, \ldots, s_N\}$ represent a set of N unique sites corresponding to the N segmented glands. Let each site $s \in S$ have an associated random variable $X_s \in \{\omega_m, \omega_b\}$ indicating its state as either malignant or benign. To refer collectively to the states of all glands we have $X=\{X_s : s \in S\}$. Each state $X_s$ is unknown; we only observe an instance of the random variable $Y_s \in R^D$ representing the D dimensional feature vector associated with gland s. Though our algorithm is extensible to any number of features, currently D=1 with $Y_s$ being the SRGA. To collectively refer to the entire scene of feature vectors we have $Y=\{Y_s : s \in S\}$.

Consider the undirected graph $G=\{S,E\}$, where the set S of sites represents the vertices and the set E contains the edges. A local neighborhood $\eta_s$ is defined as follows: $\eta_s=\{r : r \in S, r \neq s, \{r,s\} \in E\}$. The set of all local neighborhoods establishes a neighborhood structure: $\eta=\{\eta_s : s \in S\}$. A clique is a set of the vertices of any fully connected subgraph of G. The set C contains all possible cliques. These concepts are best understood in the context of an example. The graph in FIG. 1 has sites $S=\{1, 2, 3, 4, 5, 6\}$ and edges $E=\{\{1, 2\}, \{1, 4\}, \{1, 5\}, \{2, 3\}, \{2, 6\}, \{4, 5\}\}$. The neighborhood of site 5, for example, is $\eta_s=\{1, 4\}$. There are six one-element cliques $C_1=\{\{1\}, \{2\}, \{3\}, \{4\}, \{5\}, \{6\}\}$, six two-element cliques $C_2=E$, and one three-element clique $C_3=\{\{1, 4, 5\}\}$. The set C is the union of these three sets. The state $X_s$ of each site is either black or white, i.e. $\Lambda=\{b,w\}$. Our specific neighborhood structure is determined by the distance between gland centroids. If $m_s$ denotes the centroid of gland s, then $r \in \eta_s$ if $\|m_s - m_r\|_2 < d$. Motivated by the pathology we choose d=0.7 mm.

To simplify notation we use $\Pr\{X_r = x_r, X_s = x_s\} \equiv p(x_r, x_s)$ for indicating the probability of a specific event, where $x_r, x_s \in \{\omega_m, \omega_b\}$. If X is a MRF with respect to the neighborhood structure $\eta$, then X satisfies the local Markov property $p(x_s | x_{-s}) = p(x_s | x_{\eta_s})$, where $x_{-s}$ indicates x without $x_s$ and $x_{\eta_s} = \{x_s : s \in \eta_s\}$. Additionally, X is a MRF with respect to $\eta$ if and only if p(x) is a Gibbs distribution [82]: $p(x) = \Pi_{c \in C} V_c(x)$, where $V_c$ are nonzero functions that depend only on those $x_s$ for which $s \in c$. The local conditional probabilities follow directly:

$$p(x_s | x_{\eta_s}) = \frac{p(x_s, x_{\eta_s})}{\sum_{\omega \in \Lambda} p(\omega, x_{\eta_s})} \quad (11)$$

$$= \frac{p(x)}{\sum_{\omega \in \Lambda} p(\omega, x_{-s})}$$

$$= \frac{\prod_{c:s \notin c} V_c(x) \prod_{c:s \in c} V_c(x)}{\prod_{c:s \notin c} V_c(x) \sum_{\omega \in \Lambda} \prod_{c:s \in c} V_c(\omega, x_{-s})}$$

$$= \frac{\prod_{c:s \notin c} V_c(x)}{\sum_{\omega \in \Lambda} \prod_{c:s \in c} V_c(\omega, x_{-s})}$$

This distribution has the same form as the Gibbs distribution for $p(x)$, but now the product is only over those cliques c that contain s.

Integration of Data Derived PMFs into the MRF

Since it is difficult to derive Gibbs distributions that model a set of training data, generic models are usually assumed. The most prevalent formulation is the Potts model which is defined as follows for two-element cliques:

$$V_{\{r,s\}}(x_r, x_s) = \begin{cases} e^{-\beta} & \text{if } x_r = x_s \text{ and } \{r,s\} \in C \\ e^{\beta} & \text{if } x_r \neq x_s \text{ and } \{r,s\} \in C. \end{cases} \quad (12)$$

The Potts model disregards all cliques having more or less than two elements, i.e. if $|c| \neq 2$ we have $V_c(x)=1$, where $|\cdot|$ signifies cardinality. Such generic models are unnecessary; assuming that all $X_s$ are i.i.d. and all $X_r$ given $X_s$ are i.i.d. for every $r \in \eta_s$, we can determine the appropriate $V_c$ directly from the data. To our knowledge, the following equations represent the first proposed means for incorporating arbitrary pmfs into the MRF structure:

$$V_s(x_s) = p(x_s)^{1-|\eta_s|} \text{ for } s \in S \quad (13)$$

$$V_{\{r,s\}}(x) = p(x_r, x_s) \text{ for } \{r,s\} \in C. \quad (14)$$

The functions $V_c$ for higher-order cliques are identically one. The validity of (13) and (14) can be seen by inserting them into (11):

$$\frac{\prod_{c:s \notin c} V_c(x)}{\sum_{\omega \in \Lambda} \prod_{c:s \in c} V_c(\omega, x_{-s})} = \frac{p(x_s)^{1-|\eta_s|} \prod_{r \in \eta_s} p(x_r, x_s)}{\sum_{\omega \in \Lambda} p(\omega)^{1-|\eta_s|} \prod_{r \in \eta_s} p(x_r, \omega)}$$

$$= \frac{p(x_s) \prod_{r \in \eta_s} p(x_r | x_s)}{\sum_{\omega \in \Lambda} p(\omega) \prod_{r \in \eta_s} p(x_r | \omega)}$$

$$= \frac{p(x_s, x_{\eta_s})}{\sum_{\omega \in \Lambda} p(\omega, x_{\eta_s})} = (x_s | x_{\eta_s}).$$

The determination of $p(x_s)$ and $p(x_r, x_s)$ from training data is straight-forward. For example, consider the randomly selected two-element clique $\{r,s\}$ where both sites are malignant. The probability $V_{\{r,s\}}(\omega_m, \omega_m) = p(\omega_m, \omega_m)$ can be found by examining all permutations of two neighboring glands and determining the percentage in which both are cancerous. The pmf $p(x_s)$ is the marginal mass function of $p(x_r, x_s)$. Since $p(x_r, x_s)$ is symmetric, both marginals are identical.

Label Estimation and Aggregation

The goal is to estimate the hidden states X given the observations Y using maximum a posteriori (MAP) estimation, i.e. maximizing $p(x|y)$ over x. Bayes laws yields $p(x|y) \propto f(y|x)p(x)$, where $\propto$ signifies proportionality. The Iterated Conditional Modes (ICM) [?] algorithm indicates that the maximization of $p(x|y)$ need not occur at all sites simultaneously; we can perform MAP estimation on each site individually by maximizing $p(x_s | x_{72\_s}, y) \propto f(y_s | x_s) p(x_s, x_{\eta_s})$. After estimating each individual state $X_s$, the entire scene of states X is updated. The process iterates until convergence, usually requiring only five or six iterations (FIGS. 13(e) and 13(k)).

Our ultimate objective is to delineate the spatial extent of the cancerous regions. Following the neighborhood structure defined above, each gland centroid can be considered the center of a disk of diameter d. If the disks of two centroids overlap, they are considered neighbors. This leads to a simple formulation for cancerous regions: the union of all disks of diameter d centered at the centroids of the malignant glands (FIGS. 13(f) and 13(l)).

Results:

Data and CAD Training:

The data consists of four H&E stained prostate WMHSs obtained from different patients. An initial pathologist used a black marker to delineate a very rough truth (RT) of CaP extent. An second pathologist performed a more detailed annotation of the digitized slices, producing a high fidelity truth (HFT). The digital images have a resolution of 0.01 mm² per pixel. The approximate image dimensions are 2.1×3.2 cm, i.e. 2100×3200 pixels. The training step involves estimating the parameters for the SRGA pdfs $f(y|\omega_m)$ and $f(y|\omega_b)$ using (10) and determining the MRF pmfs in (13) and (14). The training/testing procedure uses a leave-one-out strategy.

Quantitative Results:

We first assess the ability of the CAD system to discriminate malignant and benign glands. The quality of the gland segmentation is implicit in this performance measure. A gland is considered cancerous if its centroid falls within the HFT. The performance of the classification step above varies as the threshold ρ increases from zero to one, yielding the receiver operator characteristic (ROC) curve (solid) in FIG. 14. Since the resulting classification serves as the initial condition for the MRF iteration, the MRF performance also varies as a function of ρ, producing the dashed ROC curve in FIG. 14. The operating points for the qualitative results in FIG. 13 are shown by the ring and dot (ρ=0.15). We next measure the accuracy of the final CAD regions produced at this operating point by comparing them with the HFT. The sensitivity (the ratio of the cancerous area correctly marked to the total cancerous area) and specificity (the ratio of benign area correctly marked to the total benign area) are 0.8670 and 0.9524, respectively.

FIG. 14 depicts a solid ROC curve that describes the performance (obtained over four studies) of the initial gland classification (without MRF) as the probability threshold ρ varies from zero to one. The classification results at each threshold ρ are passed to the MRF iteration, yielding the dashed ROC curve. The operating points for the qualitative results in FIG. 13 are shown by the ring and dot (ρ=0.15).

Qualitative Results:

Qualitative results for two WMHSs were previously presented as FIG. 13.

CONCLUSION

Over a cohort of four studies we have demonstrated in the present embodiment a simple, powerful, and rapid—requiring only four to five minutes to analyze a 2100×3200 image on 2.4 Ghz Intel Core2 Duo Processors—method for the detection of CaP from low-resolution whole-mount histology specimens. Relying only on gland size and proximity, the CAD algorithm highlights the effectiveness of embedding physically meaningful features in a probabilistic framework that avoids heuristics. The above embodiment introduces a novel method for formulating data derived pmfs as Gibbs distributions, obviating the need for generic MRF models.

REFERENCES

[1] Scott Doyle, Carlos Rodriguez, Anant Madabhushi, John Tomaszeweski, and Michael Feldman, "Detecting prostatic adenocarcinoma from digitized histology using a multi-scale hierarchical classification approach.," *Conf Proc IEEE Eng Med Biol Soc*, vol. 1, pp. 4759-4762, 2006.

[2] S. Doyle, A. Madabhushi, M. Feldman, and J. Tomaszeweski, "A boosting cascade for automated detection of prostate cancer from digitized histology," *MICCAI*, pp. 504-511, 2006.

[3] M. A. Roula, A. Bouridane, F. Kurugollu, and A. Amira, "A quadratic classifier based on multispectral texture features for prostate cancer diagnosis," in *Signal Processing and Its Applications*, 2003. *Proceedings. Seventh International Symposium on*, July 2003, vol. 2, pp. 37-40 vol. 2.

[4] James Diamond, Neil H Anderson, Peter H Bartels, Rodolfo Montironi, and Peter W Hamilton, "The use of morphological characteristics and texture analysis in the identification of tissue composition in prostatic neoplasia.," *Hum Pathol*, vol. 35, no. 9, pp. 1121-1131, September 2004.

[5] Reza Farjam, Hamid Soltanian-Zadeh, Kourosh Jafari-Khouzani, and Reza A Zoroofi, "An image analysis approach for automatic malignancy determination of prostate pathological images.," *Cytometry B Clin Cytom*, vol. 72, no. 4, pp. 227-240, July 2007.

[6] S Naik, S Doyle, A Madabhushi, J Tomaszewski, and M Feldman, "Gland segmentation and gleason grading of prostate histology by integrating low-, high-level and domain specific information," *Workshop on Microscopic Image Analysis with Applications in Biology*, 2007.

[7] A. Tabesh, M. Teverovskiy, Ho-Yuen Pang, V. P. Kumar, D. Verbel, A. Kotsianti, and O. Saidi, "Multifeature prostate cancer diagnosis and gleason grading of histological images," *IEEE Transactions on Medical Imaging*, vol. 26, no. 10, pp. 1366-1378, October 2007.

[8] S. Doyle, S. Agner, A. Madabhushi, M. Feldman, and J. Tomaszewski, "Automated grading of breast cancer histopathology using spectral clustering with textural and architectural image features," in *Proc. 5th IEEE International Symposium on Biomedical Imaging: From Nano to Macro ISBI* 2008, 14-17 May 2008, pp. 496-499.

[9] M. Roula, J. Diamond, A. Bouridane, P. Miller, and A. Amira, "A multispectral computer vision system for automatic grading of prostatic neoplasia," in *Proc. IEEE International Symposium on Biomedical Imaging*, 7-10 Jul. 2002, pp. 193-196.

[10] Po-Whei Huang and Cheng-Hsiung Lee, "Automatic classification for pathological prostate images based on fractal analysis.," *IEEE Trans Med Imaging*, vol. 28, no. 7, pp. 1037-1050, July 2009.

[11] T. N. Pappas, "An adaptive clustering algorithm for image segmentation," *IEEE Transaction on Signal Processing*, vol. 40, no. 4, pp. 901-914, April 1992.

[12] C. A. Bouman and M. Shapiro, "A multiscale random field model for bayesian image segmentation," *IEEE Transactions on Image Processing*, vol. 3, no. 2, pp. 162-177, March 1994.

[13] J. Besag, "On the statistical analysis of dirty pictures," *Journal of the Royal Statistical Society. Series B (Methodological)*, vol. 48, no. 3, pp. 259-302, 1986.

[14] M. A. T. Figueiredo and J. M. N. Leitao, "Unsupervised image restoration and edge location using compound gauss-markov random fields and the mdl principle;" *IEEE Transactions on Image Processing*, vol. 6, no. 8, pp. 1089-1102, August 1997.

[15] R. Paget and 1. D. Longstaff, "Texture synthesis via a noncausal nonparametric multiscale markov random field," *IEEE Transactions on Image Processing*, vol. 7, no. 6, pp. 925-931, June 1998.

[16] AJexey Zalesny and Luc J. Van Gool, "A compact model for viewpoint dependent texture synthesis," In *SMILE Workshop*, London, UK, 2001, pp. 124-143, Springer-Verlag.

[17] James Monaco, John E. Tomaszewski, Michael D. Feldman, Mehdi Moradi, Parvin Mousavi, Alexander Boag, Chris Davidson, Purang Abolmaesumi, and Anant Madabhushi, "Probabilistic pairwise markov models: application to prostate cancer detection," *Medical Imaging* 2009: *Image Processing*, vol. 7259, no. I, pp. 725903, 2009.

[18] S. Geman and D. Geman, "Stochastic relaxation, gibbs distribution, and the bayesian restoration of images," *IEEE Transactions on Pattern Recognition and Machine Intelligence*, vol. 6, pp. 721-741, 1984.

[19] J. Yedidia, W. Freeman, and Y. Weiss, "Generalized belief propagation," *Advances in Neural Information Processing Systems*, pp. 689-695, 2000.

[20] Y. Boykov, O. Veksler, and R. Zabih, "Fast approximate energy minimization via graph cuts," *IEEE Transactions on Pattern Analysis and Machine Intelligence*, vol. 23, no. II, pp. 1222-1239, November 2001.

[21] R. C. Dubes, A. K. Jain, S. G. Nadabar, and C. C. Chen, "Mrf model-based algorithms for image segmentation," in *Proceedings of the* 10*th International Conference on Pattern Recognition,* 1990, vol. i, pp. 808-814 voU.

[22] R. Szeliskl, R. Zabih, D. Scharstein, O. Veksler, V. Kolmogorov, A. Agarwala, M. Tappen, and C. Rother, "A comparative study of energy minimization methods for markov random fields with smoothness-based priors," *IEEE Transactions on Pattern Analysis and Machine Intelligence*, vol. 30, no. 6, pp. 1068-1080, June 2008.

[23] J. Marroquin, S. Miller, and T. Poggio, "Probabilistic solution of ill-posed problems in computational vision," Tech. Rep. AIM-897, MIT Artificial Intelligence Laboratory, Mar. 6, 1987.

[24] J. L. Marroquin, B. C. Vemuri, S. Botello, E. Calderon, and A. Femandez-Bouzas, "An accurate and efficient bayesian method for automatic segmentation of brain mri," *IEEE Transactions on Medical Imaging*, vol. 21, no. 8, pp. 934-945, August 2002.

[25] Jonathan Chappel ow, Satish Viswanath, James Monaco, Mark Rosen, John Tomaszewski, Michael Feldman, and Anant Madabhushi, "Improving supervised classification accuracy using non-rigid multimodal image registration: detecting prostate cancer," 2008, vol. 6915, p. 69150V; SPIE.

[26] R. Duda, P. Hart, and D. Stork, *Pattern Classification*, John Wiley & Sons, 2001.

[27] N. Metropolis, A. W. Rosenbluth, M. N. Rosenbluth, A. H. Teller, and E. Teller, "Equation of state calculations by fast computing machines," 1. *Chem. Phys.*, vol. 21, pp. 1087-1092, June 1953.

[28] T. N. Pappas, "An adaptive clustering algorithm for image segmentation," *IEEE Transaction on Signal Processing*, vol. 40, no. 4, pp. 901-914, April 1992.

[29] J. Besag, "On the statistical analysis of dirty pictures," *Journal of the Royal Statistical Society. Series B (Methodological)*, vol. 48, no. 3, pp. 259-302, 1986.

[30] M. A T. Figueiredo and 1. M. N. Leitao, "Unsupervised image restoration and edge location using compound gauss-markov random fields and the mdl principle," *IEEE Transactions on Image Processing*, vol. 6, no. 8, pp. 1089-1102, August 1997.

[31] R. Paget and J. D. Longstaff, "Texture synthesis via a noncausal nonparametric multiscale markov random field, "*IEEE Transactions on Image Processing*, vol. 7, no. 6, pp. 925-931, June 1998.

[32] Alexey Zalesny and Luc J. Van Gool, "A compact model for viewpoint dependent texture synthesis," in *SMILE Workshop*, London, UK, 2001. pp. 124-143, Springer-Verlag.

[33] Y. Zhang, M. Brady, and S. Smith, "Segmentation of brain rnr images through a hidden markov random field model and the expectation-maximization algorithm," *IEEE Transactions on Medical Imaging*, vol. 20, no. I, pp. 45-57, January 2001.

[34] A A Farag, A S. E I-Baz, and G. Gimel'farb, "Precise segmentation of multimodal images," *IEEE Transactions on Image Processing*, vol. 15, no. 4, pp. 952-968, April 2006.

[35] H. D. Li, M. Kallergi, L. P. Clarke, V. K. Jain, and R. A. Clark, "Markov random field for tumor detection in digital mammography," *Medical Imaging, IEEE Transactions on*, vol. 14, no. 3, pp. 565-576, September 1995.

[36] S. Awate, T. Tasdizen, and R. Whitaker, "Unsupervised texture segmentation with nonparametric neighborhood statistics," in *Computer Vision ECCV*, 2006, pp. 494-507.

[37] C. A Bouman and M. Shapiro, "A multiscale random held model for bayesian image segmentation," *IEEE Transactions on Image Processing*, vol. 3, no. 2, pp. 162-177, March 1994.

[38] J. Wu and A C. S. Chung, "A segmentation model using compound markov random fields based on a boundary model," *IEEE Transactions on Image Processing*, vol. 16, no. I, pp. 241-252, January 2007. [12] J. Besag, "Spatial interaction and the statistical analysis of lattice systems," *Journal of the Royal Statistical Society. Series B (Methodological)*, vol. 36, no. 2, pp. 192-236, 1974.

[39] S. Geman and D. Geman, "Stochastic relaxation, gibbs distribution, and the bayesian restoration of images," *IEEE Transactions on Pattern Recognition and Machine Intelligence*, vol. 6, pp. 721-741, 1984.

[40] A. A. Efros and T. K. Leung, "Texture synthesis by non-parametric sampling," *The Proceedings of the Seventh IEEE International Conference on Computer Vision*, vol. 2, pp. 1033-1038, 1999.

[41] M. Hammersley and P. Clifford, "Markov field on finite graphs and lattices," Unpublished, 1971.

[42] A. Levada, N. Mascarenhas, and A. Tannus, "Pseudo-likelihood equations for potts mrf model parameter estimation on higher order neighborhood systems," *IEEE Geoscience and Remote Sensing Letters*, vol. 5, no. 3, pp. 522-526, July 2008.

[43] J. Chappelow, N. Bloch, N. Rofsky, E. Genega, R. Lenkinski, W. DeWolf, S. Viswanath, and A. Madabhushi, "Collinarus: Collection of image-derived non-linear attributes for registration using splines," *SPIE Medical Imaging*, vol. 7260, 2009.

[44] S. Viswanath, B. Bloch, M. Rosen, J. Chappelow, R. Toth, R. Lenkinski N. Rofsky, E. Genega, A. Kalyanpur, and A. Madabhushi, "Integrating structural and functional imaging for computer assisted detection of prostate cancer on multi-protocol in vivo 3 tesla mri," *SPIE Medical Imaging*, vol. 7260, 2009.

[45] S. Doyle, M. Hwang, S. Naik, A. Madabhushi, M. Feldman, and T. Tomaszewski, "Using manifold learning for content-based image retrieval of prostate histopathology," in *MICCAI* 2007 *Workshop: Content-based Image Retrieval for Biomedical Image Archives: achievements, problems and prospects*, 2007.

[46] M. J. Donovan, S. Hamann, M. Clayton, P. M Khan, M. Sapir, V. Bayer-Zubek, G. Fernandez, R. Mesa-Tejada, M. Teverovskiy, V. Reuter, P. Scardino, and C. Cordon-Cardo, "Systems pathology approach for the prediction of prostate cancer progression after radical prostatectomy.," *J Clin Oncol*, vol. 26, no. 24, pp. 3923-3929, August 2008.

[47] C. Cordon-Cardo, A. Kotsianti, D. Verbel, M. Teverovskiy, P. Capodieci, S. Hamann, Y. Jeffers, M. Clayton, F. Elkhettabl, F. Khan, M. Sapir, V. BayerZubek, Y. Vengrenyuk, S. Fogarsi, O. Saidi, V. Reuter, H. Scher, M. Kattan, F. Bianco, T. Wheeler, G. Ayala, P. Scardino, and M. Donovan, "Improved prediction of prostate cancer recurrence through systems pathology.," *J Clin Invest*, vol. 117, no. 7, pp. 1876-1883, July 2007.

[48] G. Begelman, E. Gur, E. Rivlin, M. Rudzsky, and Z. Zalevsky, "Cell nuclei segmentation using fuzzy logic engine," in *ICIP*, 2004, pp. V: 2937-2940. [23] U. Adiga, R. Malladi, R. Fernandez-Gonzalez, and C. O. de Solorzano, "High-throughput analysis of multispectral images of breast cancer tissue," *Image Processing, IEEE Transactions on*, vol. 15, no. 8, pp. 2259-2268, August 2006.

[49] S. Doyle, A. Madabhushi, M. Feldman, and J. Tomaszeweski, "A boosting cascade for automated detection of prostate cancer from digitized histology," *MICCAI*, pp. 504-511, 2006.

[50] S. Doyle, M. Hwang, K. Shah, A. Madabhushi, M. Feldman, and J. Tomaszeweski, '~utomated grading of prostate cancer using architectural and textural image features," in *ISBI*, 12-15 Apr. 2007, pp. 1284-1287.

[51] S Naik, S Doyle, A Madabhushi, J Tomaszewski, and M Feldman, "Gland segmentation and gleason grading of prostate histology by integrating low-, high-level and domain specific information," *Workshop on Microscopic Image Analysis with Applications in Biology*, 2007.

[52] S. Naik, S. Doyle, S. Agner, A. Madabhushi, M. Feldman, and J. h Tomaszewski, automated gland and nuclei segmentation for grading of prostate and breast cancer histopathology," *ISBI*, pp. 284-287, May 2008.

[53] M. Gao, P. Bridgman, and, Kumar, "Computer-aided prostate cancer diagnosis using image enhancement and jpeg2000," 2003, vol. 5203, pp. 323-334, SPIE.

[54] A. Hafiane, F. Bunyak, and K. Palaniappan, "Fuzzy clustering and active contours for histopathology image segmentation and nuclei detection," in *Advanced Concepts for Intelligent Vision Systems*, 2008, pp. 903-914.

[55] V. Kumar, A. Abbas, and N. Fausto, *Robbins and Cotran Pathologic Basis of Disease*, Saunders, 2004. [31] R. Duda, P. Hart, and D. Stork, *Pattern Classification*, John Wiley & Sons, 2001.

[56] S. Banerjee, B. Carlin, and A. Gelfand, *Hierarchical Modeling and Analysis for Spatial Data*, CRC Press, 2004.

[57] G. Grimmett, "A theorem about random fields," *Bulletin of the London Mathematical Society*, vol. 5, no. 13, pp. 81-84, 1973. [34] J. Moussouris, "Gibbs and markov random systems with constraints," *Journal of Statistical Physics*, vol. 10, pp. 11-33, January 1974.

[58] D. Geman, "Random fields and inverse problems in imaging," in *Lecture Notes in Mathematics*. 1991, vol. 1427, pp. 113-193, Springer-Verlag. [36] R. B. Potts, "Some generalised order-disorder transformations," *Proceedings of the Cambridge Philosophical Society*, vol. 48, pp. 106-109, 1952.

[59] R. Paget, "Strong markov random field model," *IEEE Transactions on Pattern Analysis and Machine Intelligence*, vol 26, no. 3, pp. 408-413, March 2004.

[60] Y. Bishop, S. Fienberg, and P. Holland, *Discrete Multivariate Analysis: Theory and Practice*, MIT Press, 1975. [39] A. K. Jain, *Fundamentals of Digital Image Processing*, Prentice Hall, 1989.

[61] S. A. Hojjatoleslami and J. Kittler, "Region growing: a new approach," *IEEE Trans. on Image Processing*, vol. 7, no. 7, pp. 1079-1084, July 1998. [41] A. Papoulis, *Probability, Random Variables, and Stochastic Processes*, McGraw-Hili, Inc., New York, N.Y., 1965.

[62] S. Geman and C. Graffigne, "Markov random field image models and their applications to computer vision," in *Proceedings of the International Congress of Mathematicians*, 1986, pp. 1496-1517.

[63] R. Szeliski, R. Zabih, D. Scharstein, O. Veksler, V. Kolmogorov, A. Agarwala, M. Tappen, and C. Rother, .~comparative study of energy minimization methods for markov random fields," in *ECCV*, 2006, pp. 16-29.

[64] R. C. Dubes, A. K. Jain, S. G. Nadabar, and C. C. Chen, "Mrfmodel-based algorithms for image segmentation," in *Proceedings of the* 10th International Conference on Pattern Recognition, 1990, vol. i, pp. 808-814 voU.

[65] R. Maitra, S. R. Roys, and R. P. Gullapalli, "Test-retest reliability estimation of functional mri data," *Magnetic Resonance in Medicine*, vol. 48, no. 1, pp. 62-70, 2002.

[66] E. Salli, H. J. Aronen, S. Savolainen, A. Korvenoja, and A. Visa, "Contextual clustering for analysis of functional mri data," *IEEE Transactions on Medical Imaging*, vol. 20, no. 5, pp. 403-414, May 2001.

[67] R. Baldick, *Applied Optimization*, Cambridge University Press, 2006.

[68] Begelman, G., Gur, E., Rivlin, E., Rudzsky, M., Zalevsky, Z.: Cell nuclei segmentation using fuzzy logic engine. In: ICIP. (2004) V: 2937-2940

[69] Naik, S., Doyle, S., Agner, S., Madabhushi, A., Feldman, M., Tomaszewski, J.: Automated gland and nuclei segmentation for grading of prostate and breast cancer histopathology. ISB! (May 2008) 284-287

[70] Gao, M., Bridgman, P., Kumar, S.: Computer-aided prostrate cancer diagnosis using image enhancement and jpeg2000. Volume 5203, SPIE (2003) 323-334

[71] Doyle, S., Madabhushi, A., Feldman, M., Tomaszeweski, J.: A boosting cascade for automated detection of prostate cancer from digitized histology. MICCAI (2006) 504-511

[72] Kumar, V., Abbas, A., Fausto, N.: Robbins and Cotran Pathologic Basis of Disease. Saunders (2004)

[73] Hojjatoleslami, S., Kittler, J.: Region growing: a new approach. IEEE Trans. on Image Processing 7(7) (July 1998) 1079-1084

[74] Geman, S., Geman, D.: Stochastic relaxation, gibbs distribution, and the bayesian restoration of images. IEEE Trans. on PAMI 6 (1984) 721-741

[75] Besag, J.: On the statistical analysis of dirty pictures. Journal of the Royal Statistical Society. Series B (Methodological) 48(3) (1986) 259-302

[76] Begelman, G., Gur, E., Rivlin, E., Rudzsky, M., Zalevsky, Z.: Cell nuclei segmentation using fuzzy logic engine. In: ICIP. (2004) V: 2937-2940

[77] Naik, S., Doyle, S., Agner, S., Madabhushi, A., Feldman, M., Tomaszewski, J.: Automated gland and nuclei segmentation for grading of prostate and breast cancer histopathology. ISBI (May 2008) 284-287

[78] Gao, M., Bridgman, P., Kumar, S.: Computer-aided prostrate cancer diagnosis using image enhancement and jpeg2000. Volume 5203., SPIE (2003) 323-334

[79] Doyle, S., Madabhushi, A., Feldman, M., Tomaszeweski, J.: A boosting cascade for automated detection of prostate cancer from digitized histology. MICCAI (2006) 504-511

[80] Kumar, V., Abbas, A., Fausto, N.: Robbins and Cotran Pathologic Basis of Disease. Saunders (2004)

[81] Hojjatoleslami, S., Kittler, J.: Region growing: a new approach. IEEE Trans. on Image Processing 7(7) (July 1998) 1079-1084

[82] Geman, S., Geman, D.: Stochastic relaxation, gibbs distribution, and the bayesian restoration of images. IEEE Trans. on PAMI 6 (1984) 721-741

[83] Besag, J.: On the statistical analysis of dirty pictures. Journal of the Royal Statistical Society. Series B (Methodological) 48(3) (1986) 259-302

[84] M. A. Roula, A. Bouridane, F. Kurugollu, and A. Amira, "A quadratic classifier based on multispectral texture features for prostate cancer diagnosis," in *Signal Processing and Its Applications*, 2003. *Proceedings. Seventh International Symposium on*, July 2003, vol. 2, pp. 37-40 vol. 2.

[85] Reza Farjam, Hamid Soltanian-Zadeh, Kourosh Jafari-Khouzani, and Reza A Zoroofi, "An image analysis approach for automatic malignancy determination of prostate pathological images.," *Cytometry B Clin Cytom*, vol. 72, no. 4, pp. 227-240, July 2007.

[86] A. Tabesh, M. Teverovskiy, Ho-Yuen Pang, V. P. Kumar, D. Verbel, A. Kotsianti, and O. Saidi, "Multifeature prostate cancer diagnosis and gleason grading of histological images," *IEEE Transactions on Medical Imaging*, vol. 26, no. 10, pp. 1366-1378, October 2007.

[87] Po-Whei Huang and Cheng-Hsiung Lee, "Automatic classification for pathological prostate images based on fractal analysis.," *IEEE Trans Med Imaging*, vol. 28, no. 7, pp. 1037-1050, July 2009.

[88] S. F. Patten, J. S. Lee, D. C. Wilbur, T. A. Bonfiglio, T. J. Colgan, R. M. Richart, H. Cramer, and S. Moinuddin, "The autopap 300 qc system multicenter clinical trials for use in quality control rescreening of cervical smears: Ii. prospective and archival sensitivity studies.," *Cancer*, vol. 81, no. 6, pp. 343-347, December 1997.

[89] Muhammad Atif Tahir and Ahmed Bouridane, "Novel round-robin tabu search algorithm for prostate cancer classification and diagnosis using multispectral imagery," *IEEE Trans Inf Technol Biomed*, vol. 10, no. 4, pp. 782-793, October 2006.

[90] K. Jafari-Khouzani and H. Soltanian-Zadeh, "Multiwavelet grading of pathological images of prostate," *IEEE Transactions on Biomedical Engineering*, vol. 50, no. 6, pp. 697-704, June 2003.

[91] S. Naik, S. Doyle, S. Agner, A. Madabhushi, M. Feldman, and J. Tomaszewski, "Automated gland and nuclei segmentation for grading of prostate and breast cancer histopathology," in *Proc. 5th IEEE International Symposium on Biomedical Imaging: From Nano to Macro ISBI 2008*, 14-17 May 2008, pp. 284-287.

[92] Yoav Smith, Gershom Zajicek, Michael Werman, Galina Pizov, and Yoav Sherman, "Similarity measurement method for the classification of architecturally differentiated images," *Comput. Biomed. Res.*, vol. 32, no. 1, pp. 1-12, 1999.

[93] G. Begelman, M. Pechuk, E. Rivlin, and E. Sabo, "System for computer-aided multiresolution microscopic pathology diagnostics," in *Proc. IEEE International Conference on Computer Vision Systems ICVS '06*, 4-7 Jan. 2006, pp. 16-16.

[94] R. Stotzka, R. Mnner, P. H. Bartels, and D. Thompson, "A hybrid neural and statistical classifier system for histopathologic grading of prostatic lesions.," *Anal Quant Cytol Histol*, vol. 17, no. 3, pp. 204-218, June 1995.

[95] James Diamond, Neil H Anderson, Peter H Bartels, Rodolfo Montironi, and Peter W Hamilton, "The use of morphological characteristics and texture analysis in the identification of tissue composition in prostatic neoplasia.," *Hum Pathol*, vol. 35, no. 9, pp. 1121-1131, September 2004.

What is claimed is:

1. A method for detecting biologically relevant structures in a hierarchical fashion comprising:
    a) performing gland segmentation on the luminance channel to produce gland boundaries;
    b) calculating morphological features for each gland;
    c) providing a Bayesian classifier for classifying and labeling the morphological features for each gland as either malignant or benign;
    d) performing MRF iteration using weighted maximum posterior marginals estimation using the labeling in step (c) as a the starting point to produce a final labeling; and
    e) consolidating glands labeled as malignant into regions.

2. The method of claim 1 wherein the biologically relevant structure is selected from the group consisting of the prostate, breast, ovary, bladder, kidney, or brain.

3. The method of claim 1 wherein the classifying and labeling morphological features in step (c) is performed using probabilistic pairwise Markov models.

4. The method of claim 1 wherein the performing a MRF iteration in step (d) is performed using weighted ICM estimation.

5. The method of claim 1 wherein the step of performing gland segmentation on the luminance channel to produce gland boundaries in step (a) is performed using CIE Lab color space.

6. The method of claim 1 wherein the step of performing gland segmentation on the luminance channel to produce gland boundaries in step (a) comprises:
    a) convolving a luminance image with a Gaussian kernel at multiple scales $\sigma_g \in \{0.2, 0.1, 0.05, 0.025\}$mm to account for varying gland size;
    b) identifying seed pixel peaks (maxima) in the smoothed images as candidate gland centers;
    c) performing a growing procedure on the pixel peaks of step (b) comprising the following steps:
        (i) initializing a current region (CR) to the specified seed pixel and establishing a $12\sigma_g \times 12\sigma_g$ bounding box centered about it and initializing a current boundary (CB) to the 8-connected pixels neighboring CR;
        (ii) identity the pixel in CB with the highest intensity and removing the highest intensity pixel from CB and adding it to CR and revising CB to include all 8 connected neighbors of the aggregated pixel which are not in CR;
        (iii) defining the internal boundary (IB) as all pixels in CR that are 8-connected with the pixels in CB and computing the current boundary strength which is defined as the mean intensity of the pixels in IB minus the mean intensity of the pixels in CB;
        (iv) repeating steps (ii) and (iii) until the algorithm attempts to add a pixel outside the bounding box;
        (v) identifying a iteration step at which the maximum boundary strength was attained and defining the optimal region as CR at this step;
        (vi) resolving any overlapping of the final segmented region by discarding the region with the lower boundary strength.

7. An automated system for detecting CaP glands in WMHSs using the method of claim 1.

8. A method for detecting biologically relevant structures in a hierarchical fashion comprising:
    a) identifying and segmenting gland lumens to produce segmented boundaries;
    b) extracting morphological features from the segmented boundaries;
    c) providing a Bayesian classifier to model the glandular area;
    d) assigning a value of probability of malignancy to each gland;
    e) classifying and labeling the gland as malignant if the probability exceeds the predetermined threshold $\tau_{area}$ or labeling the gland as benign if the probability does not exceed the predetermined threshold $\tau_{area}$;
    f) using a MRF algorithm to refine the labeling of step(c).

9. The method of claim 8 wherein the classifying and labeling a gland in step (e) is performed using probabilistic pairwise Markov models.

10. A computer-based system for identifying and assessing the biological significance of abnormal regions in medical images comprising:
    a) segmenting and consolidating biologically relevant structures using the individual features of these structures, the features and classes of those structures that surround them, and the architectural arrangement of the structures; and
    b) analyzing the biologically relevant structures in a hierarchical manner using a Bayesian classifier to assess the biological significance of any abnormal regions;
    c) assigning the biological significance of step (b) to one of two classes by performing MRF iteration using weighted maximum posterior marginals estimation: those regions in which the available regions in which the available information is sufficient to make an assessment of the biological significance or those regions that should be examined at the next hierarchical level.

11. The system of claim 10 wherein the biologically relevant structure is selected from the group consisting of the prostate, breast or ovary.

12. The method of claim 10, whereby the said medical image is a digitized histological section or tissue micro-array of the prostate, breast, ovary, bladder, kidney, or brain.

13. The method of claim 10, whereby the said medical image is a radiological image including, but not limited to, an x-ray, magnetic resonance, positron emission tomography, or CAT scan of a prostate, breast, ovary, bladder, kidney, or brain.

14. The method of claim 10, whereby the said biologically relevant structures are breast calcifications, prostate glands (acini), or breast lesions.

15. The method of claim 10, whereby the said biologically relevant structures are cells or lymphocytes of the prostate, breast, or ovary.

16. The method of claim 10, whereby the said hierarchy consists of images at different resolutions.

17. The method of claim 10, whereby the said individual features describe the morphological, textural, and/or intensity (derived from either color or grey-scale images) of the structures.

18. The method of claim 10, whereby the said individual feature is area, width, length, curvature, perimeter, aspect ratio, and compactness.

19. The method of claim 10, whereby the said individual feature is first-order, Haralick, wavelet, or Gabor.

20. The method of claim 10, whereby said individual feature is an average, a median, a standard deviation, a difference, a Sobel filter, a Kirsch filter, a horizontal derivative, a vertical derivative, or a diagonal derivative of a pre-selected determinant.

21. The method of claim 10, wherein said individual feature is calculated from the boundary of either the structure as the ratio of the structure's area to the area of the smallest circle that circumscribes the structure; the standard deviation, variance, or ratio of the maximum to the average distance between the structure center of mass and the boundary; the ratio of the estimated boundary length (the boundary calculated using a fraction of the boundary pixels) to the actual boundary length; ratio of the boundary length to the area enclosed by the boundary; and the sum of the difference between the distance from the center of the structure to the boundary and the average of the distances from the center to the two adjacent points.

22. The method of claim 10, whereby the said abnormal regions denote cancer, pre-malignant lesions, prostate intraepithelial neoplasia, or the presence of breast microcalcifications.

23. The method of claim 10, whereby the said assessment is Gleason grading or Bloom-Richardson grading.

24. The method of claim 10, whereby the said assessment is an indicator of cancer recurrence, disease aggressiveness, diagnosis, prognosis, or theragnosis.

25. The method of claim 10, whereby the said architectural feature is the density of the structures or the average direction of the major axis of the structures.

26. The method of claim 10, wherein said architectural feature is computed from a Delaunay graph is the standard deviation, average, ratio of minimum to maximum, or disorder of the side lengths or areas of the triangles in the Delaunay graph of said image.

27. The method of claim 10, wherein said architectural feature is computed from a minimum spanning tree is the standard deviation, average, ratio of minimum to maximum, or disorder of the edge lengths in the minimum spanning tree of said image.

28. A computer-aided diagnosis system to automatically detect and grade the extent of LI in digitized HER2+ BC histopathology images comprising:

a) identifying candidate image locations that may represent centers of lymphocytic nuclei using a region-growing algorithm to define sharp, well-defined boundaries;
b) refining the initial lymphocyte identification of step (a) using a Maximum a Posteriori estimation to incorporate domain knowledge regarding lymphocyte size, luminance, and spatial proximity;
c) further refining the detection result of step (b) using a Markov Random Field model to ensure that an object is more likely to be labeled as a lymphocyte nucleus if it surrounded by other lymphocyte nuclei;
d) reiterating the Markov Random Field model of step (c) until convergence by using an Iterated Conditional Modes algorithm.

29. The system of claim 28 wherein the Maximum a Posteriori estimation of step (b) is a Bayesian model used in conjunction with object size and luminance to classify individual objects as either lymphocyte or BC nuclei.

30. A method for detecting biologically relevant structures in a hierarchical fashion comprising:
a) identifying and segmenting biologically relevant structures;
b) calculating morphological or textural features for each biologically relevant structure;
c) providing a Bayesian classifier to model the biologically relevant structure;
d) classifying each biologically relevant structure using a MRF iteration using weighted maximum posterior marginals estimation;
e) consolidating each biologically relevant structure into regions;
f) drawing biological conclusions from consolidated regions.

31. The method of claim 30 wherein the biologically relevant structure is selected from the group consisting of the prostate, breast, ovary, bladder, kidney, or brain.

32. The method of claim 30 wherein the classifying each biologically relevant structure using a MRF in step (c) is performed using probabilistic pairwise Markov models.

33. The method of claim 30 wherein the step of identifying and segmenting biologically relevant structures in step (a) is performed using CIE Lab color space.

34. The method of claim 30 wherein the step of identifying and segmenting biologically relevant structures in step (a) comprises:
a) convolving a luminance image with a Gaussian kernel at multiple scales $\sigma_g \in \{0.2, 0.1, 0.05, 0.025\}$mm to account for varying gland size;
b) identifying seed pixel peaks (maxima) in the smoothed images as candidate gland centers;
c) performing a growing procedure on the pixel peaks of step (b) comprising the following steps:
(i) initializing a current region (CR) to the specified seed pixel and establishing a $12\sigma_g \times 12\sigma_g$ bounding box centered about it and initializing a current boundary (CB) to the 8-connected pixels neighboring CR;
(ii) identity the pixel in CB with the highest intensity and removing the highest intensity pixel from CB and adding it to CR and revising CB to include all 8 connected neighbors of the aggregated pixel which are not in CR;
(iii) defining the internal boundary (IB) as all pixels in CR that are 8-connected with the pixels in CB and computing the current boundary strength which is defined as the mean intensity of the pixels in IB minus the mean intensity of the pixels in CB;

(iv) repeating steps (ii) and (iii) until the algorithm attempts to add a pixel outside the bounding box;
(v) identifying a iteration step at which the maximum boundary strength was attained and defining the optimal region as CR at this step;
(vi) resolving any overlapping of the final segmented region by discarding the region with the lower boundary strength.

35. An automated system for detecting CaP glands in WMHSs using the method of claim 30.

* * * * *